US008991882B2

(12) United States Patent
Dey et al.

(10) Patent No.: US 8,991,882 B2
(45) Date of Patent: Mar. 31, 2015

(54) PROCESS AND APPARATUS FOR COATING A POROUS SUBSTRATE WITH A COATING LIQUID

(75) Inventors: Clifford Dey, Riegelsville, PA (US); Markus Bohn, Stuttgart (DE); Hans-Steffen Schacht, Grosserlach (DE); Ashley P. Deanglis, Skillman, NJ (US); Robert W. Van Holten, Flemington, NJ (US); Dwayne Looney, Flemington, NJ (US); Gerard Llanos, Stewartsville, NJ (US); Avner Brandes, New York, NY (US)

(73) Assignee: Ethicon, Inc., Somerville, NJ (US)

( * ) Notice: Subject to any disclaimer, the term of this patent is extended or adjusted under 35 U.S.C. 154(b) by 522 days.

(21) Appl. No.: 12/993,192

(22) PCT Filed: May 22, 2008

(86) PCT No.: PCT/US2008/064496
§ 371 (c)(1),
(2), (4) Date: Dec. 13, 2010

(87) PCT Pub. No.: WO2009/142636
PCT Pub. Date: Nov. 26, 2009

(65) Prior Publication Data
US 2011/0086175 A1 Apr. 14, 2011

(51) Int. Cl.
*B25J 15/00* (2006.01)
*B05D 1/18* (2006.01)
(Continued)

(52) U.S. Cl.
CPC . *B05D 1/18* (2013.01); *B05C 13/02* (2013.01); *B05C 3/02* (2013.01)
USPC ............................................ 294/61; 294/192

(58) Field of Classification Search
CPC ............... E01H 2001/1233; B65H 3/22; B25J 15/0028; B25J 15/00
USPC .................................................... 294/61, 192
See application file for complete search history.

(56) References Cited

U.S. PATENT DOCUMENTS 5,054,831 A * 10/1991 Ting et al. ....................... 294/61
5,114,132 A 5/1992 Arato et al.
(Continued)

FOREIGN PATENT DOCUMENTS

DE 8805212 6/1988
DE 8811030 10/1988
(Continued)

OTHER PUBLICATIONS

International Search Report re: PCT/US2008/064496 dated Feb. 24, 2009.
(Continued)

*Primary Examiner* — Saul Rodriguez
*Assistant Examiner* — Gabriela Puig
(74) *Attorney, Agent, or Firm* — David R. Crichton; Leo B. Kriksunov

(57) ABSTRACT

An engagement head for engaging a porous substrate includes at least two pin sets, each pin set including a plurality of pins arranged in a plurality of parallel pin rows at a predetermined pin angle, wherein pins of immediately neighboring pin rows are arranged such that pin angles for the pins in a pin row are inversely symmetrical to pin angles for the pins in a neighboring pin row. The pins of a pin row move collectively in the same direction when a pin set is extended, which direction is determined by the pin angle of the pin row, whereby neighboring pin rows move in opposite longitudinal directions from one another when the pin set is extended. The pin sets may be extended and retracted in unison by a single actuation source.

7 Claims, 18 Drawing Sheets

(51) Int. Cl.

| | |
|---|---|
| ***B05C 13/02*** | (2006.01) |
| ***B05C 3/02*** | (2006.01) |

(56) References Cited

U.S. PATENT DOCUMENTS

| | | | | |
|---|---|---|---|---|
| 5,116,094 | A * | 5/1992 | Jones | 294/81.61 |
| 5,399,667 | A | 3/1995 | Frazier | |
| 5,688,013 | A | 11/1997 | Sehrt | |
| 8,104,807 | B2 * | 1/2012 | Maffeis | 294/61 |
| 8,141,920 | B2 * | 3/2012 | Butler et al. | 294/61 |
| 2006/0257457 | A1 | 11/2006 | Gorman et al. | |
| 2011/0089709 | A1 * | 4/2011 | Neeper | 294/119.1 |

FOREIGN PATENT DOCUMENTS

| | | |
|---|---|---|
| DE | 3907104 | 9/1990 |
| DE | 4108301 | 9/1992 |
| DE | 29616661 | 11/1996 |
| JP | 11-79442 | 7/1989 |
| JP | 61-11637 | 4/1994 |
| JP | 2007-533476 | 11/2007 |
| SU | 1315030 | 6/1987 |
| SU | 1344426 | 10/1987 |
| SU | 1386318 | 4/1988 |
| WO | WO 88/04271 | 6/1988 |
| WO | WO 95/24974 | 9/1995 |
| WO | 96/40033 | 12/1996 |
| WO | WO 2005/102620 | 11/2005 |
| WO | 2007/044026 | 4/2007 |
| WO | 2009/040034 | 4/2009 |

OTHER PUBLICATIONS

Russian Official Decision of Grant re: 2010152345 dated Jul. 18, 2012.

Chung, J., et al. 'Thrombospondin-1 Acts Via IAP/CD47 to Synergize with Collagen in alpha2beta Mediated Platelet Activation' Blood, vol. 94, No. 2, Jul. 15, 1999 pp. 642-648.

Dorahy, D.J. et al. 'Stimulation of Platelet Activation and Aggregation by a Carboxyl-terminal Peptide from Thrombospondin Binding to the Integrin-associated Protein Receptor' The Journal of Biological Chemistry vol. 272, No. 2, Jan. 10, 1997.

Trumel, C., et al. 'Platelet Aggregation Induced by the C-terminal peptide of thrombospondin-1 requires the docking protein LAT but is largely independent of alpha Ib/beta3' Journal of Thrombosis and Haemostasis, Feb. 2003, vol. 1, No. 2, pp. 320-329.

* cited by examiner

PROCESS AND APPARATUS FOR COATING A POROUS SUBSTRATE WITH A COATING LIQUID

This application is a national stage filing of International Application No. PCT/US2008/064496, filed May 22, 2008, which is incorporated herein by reference in its entirety.

FIELD OF THE INVENTION

The invention relates to an apparatus and process for applying a uniform coating of a coating liquid to a porous substrate, and more particularly, an engagement head and pickup assembly for applying a powder or a powder suspended in a carrier media to a single surface of a porous substrate to create a combination medical device.

BACKGROUND

The application of coating liquids to substrates is known in the art. Factors used in determining a method of liquid application to a substrate include the interaction of the coating liquid with the substrate, the environment in which the application will take place, the nature of the substrate, e.g., solid, porous, etc., and any environmental hazard created by the carrying agent of the coating liquid.

Conventional application methods including spraying the coating liquid onto a substrate and immersing a substrate in a bath of coating liquid are known. However, spraying is not an acceptable option if the coating liquid is an environmental hazard. In addition, spraying does not always provide the high quality standards required for some applications, e.g., medical applications wherein coating liquids are coated onto a surface of a porous substrate for a medical use. In this setting, spraying may negatively affect the uniformity of the dosing of the coating liquid onto the surface of the substrate as well as the recovery rate of coating liquid. For sprayed media, the recovery rate is only 50 to 80% of sprayed media. When the media being sprayed is costly, this recovery rate could be problematic.

With regard to immersion in a bath, again there is a problem with recovery and dose uniformity. Further, this method is not viable if it is desired to coat only one side of a substrate. With further regard to immersion, it is known to use vacuum pickup of a substrate prior to immersing the substrate; however, this method is not viable if the substrate is porous.

Based on the foregoing, a need exists for an improved method of applying coating liquids to a substrate, particularly to a porous substrate, used in medical applications.

SUMMARY

The present invention includes many aspects and features.

In a first aspect of the invention, an engagement head for engaging a porous substrate without deforming or damaging the substrate includes a plurality of pins arranged in a plurality of parallel pin rows at a predetermined pin angle. Pins of immediately neighboring pin rows are arranged such that pin angles for the pins in a pin row are inversely symmetrical to pin angles for the pins in a neighboring pin row. The pins of a pin row move collectively in the same direction when the plurality of pins is extended. The direction is determined by the pin angle of the pin row, therefore, neighboring pin rows move in opposite longitudinal directions from one another when the plurality of pins is extended. In addition, the plurality of pins is arranged to have a substantially uniform extension length when extended from a bottom surface of the engagement head to enable the extended plurality of pins to engage a surface of the substrate.

In a feature of this aspect, the plurality of pins is arranged in four parallel pin rows. In another feature of this aspect, the pin angle is between 15° and 45°. With regard to this feature, it is preferred that the pin angle is 28°.

In an additional feature, each pin row includes five pins. In a further feature, ends of neighboring pin rows are offset from one another and ends of alternating pin rows are aligned with one another.

In a second aspect of the invention, a pickup assembly for engaging a surface of a substrate includes a cover plate, a pin mounting block configured to fit in the cover plate and configured to receive a pair of actuating pedals in an arrangement enabling the actuating pedals to move between a retracted position and an engagement position, and a plurality of pin supports having a plurality of pins extending from surfaces thereof. The plurality of pin supports are mounted to the actuating pedals such that the plurality of pins are directed to the cover plate and such that movement of the plurality of pin supports is controlled by the actuating pedals. The plurality of pins is extended from a surface of the cover plate when the actuating pedals are in the engagement position thus enabling the plurality of pins to engage the surface of the substrate. The plurality of pins is retracted away from the surface of the cover plate when the actuating pedals are in the retracted position thus enabling the plurality of pins to release the surface of the substrate.

In a feature of this aspect, the cover plate includes a recess configured to receive the pin mounting block. With regard to this feature, the recess includes a plurality of slots formed in a floor of the recess for extension therethrough of the plurality of pins when the actuating pedals are in the engagement position.

In another feature of this aspect, an actuating force moving the actuation pedals between the engagement position and the retracted position is provided by a single actuation source. In an additional feature, the pickup assembly includes a plurality of pin mounting blocks and the cover plate includes a plurality of recesses configured to receive the plurality of pin mounting blocks.

In an additional feature, the pin mounting block and the pair of actuating pedals are configured to move in sliding engagement with one another to move the pair of actuating pedals between the retracted position and the engagement position. In further features, the pickup assembly includes four pin supports and five pins per pin support. In yet another feature, the plurality of pins extends from the surfaces of the plurality of pin supports at an angle.

In a third aspect of the invention, a process for engaging and releasing a porous substrate includes multiple steps. An initial step includes providing an apparatus having a platform for placement of the porous substrate and also having an engagement head including a plurality of extendable and retractable pins for engaging, retaining, and releasing the substrate, wherein the plurality of pins are arranged in a plurality of parallel pin rows at a predetermined pin angle, wherein pins of immediately neighboring pin rows are arranged such that pin angles for the pins in a pin row are inversely symmetrical to pin angles for the pins in a neighboring pin row. Further steps include placing the substrate on the platform of the apparatus and lowering the engagement head to a pickup position. An additional step includes extending the pins of the engagement head to engage a surface of the substrate whereby the substrate is engaged without the surface of the substrate being damaged or deformed. Other steps include lifting the engaged substrate from the substrate platform; lowering the engagement head with the engaged substrate to a release position; and retracting the pins of the engagement head to release the substrate.

In a feature of this aspect, the pickup position is determined based on a length that the pins extend from the engagement head and a thickness of the substrate.

In another feature, the process includes the step of verifying that the substrate is engaged using a sensor array of the engagement head. With regard to this feature, the process further includes the step of verifying that the substrate is lifted evenly using the sensor array.

In a fourth aspect of the invention, a process for applying a uniform coating of a coating liquid to a surface of a porous substrate includes many steps. An initial step includes providing an apparatus having a platform for placement of the porous substrate disposed in a coating vessel. The apparatus also has an engagement head including a plurality of extendable and retractable pins for engaging, retaining, and releasing the substrate, wherein the plurality of pins are arranged in a plurality of parallel pin rows at a predetermined pin angle, and wherein pins of immediately neighboring pin rows are arranged such that pin angles for the pins in a pin row are inversely symmetrical to pin angles for the pins in a neighboring pin row. Additional steps include placing the coating vessel containing the substrate on the platform of the apparatus and extending the pins of the engagement head to engage a surface of the substrate. Further steps include lifting the engaged substrate out of the coating vessel; verifying that the substrate is evenly engaged using the sensor array; and pouring the coating liquid into the empty coating vessel. Next steps include after the coating liquid has been poured into the coating vessel, lowering the evenly engaged substrate to a release position; and retracting the pins of the engagement head to release the substrate evenly into the coating vessel thereby enabling uniform coating of a surface of the substrate.

In a feature of this aspect, the porous substrate consists of a flexible fabric matrix manufactured from oxidized regenerated cellulose fabric backing into which polyglactin 910 fibers have been embedded. In another feature of this aspect, the coating liquid consists of a suspension formed by suspending human fibrinogen and human thrombin in a hydrofluoroether solvent.

BRIEF DESCRIPTION OF THE FIGURES

The present invention will be described in detail with reference to the accompanying drawings, wherein the same elements are referred to with the same reference numerals, and wherein.

DETAILED DESCRIPTION

An apparatus and process for precisely engaging, releasing, and placing a porous substrate without deforming or damaging the substrate is disclosed. As described herein, the apparatus and process are used to apply a uniform coating of a coating liquid to a surface of a porous substrate to create a combination medical device. However, the apparatus and process may be used for many operational functions wherein a porous substrate needs to be precisely lifted and placed, including, for example, quality control functions and packaging functions.

The combination medical device formed by the process described herein is a fibrin patch. The fibrin patch is a bioabsorbable combination product composed of two human-derived haemostatic proteins, thrombin and fibrinogen, applied to a flexible composite substrate and packaged in a sealed foil pouch. The fibrin patch has been developed to slow and stop active bleeding including challenging and severe bleeding. It functions through the physiological mechanisms of fibrin clot formation, which are initiated upon contact of the patch with a bleeding wound surface. Although the process disclosed herein may be used for forming the fibrin patch, it should be understood that the process is not limited to formation of the fibrin patch, but rather, may be used in any application wherein it is desired to coat a porous substrate with a coating liquid.

Figure 1:
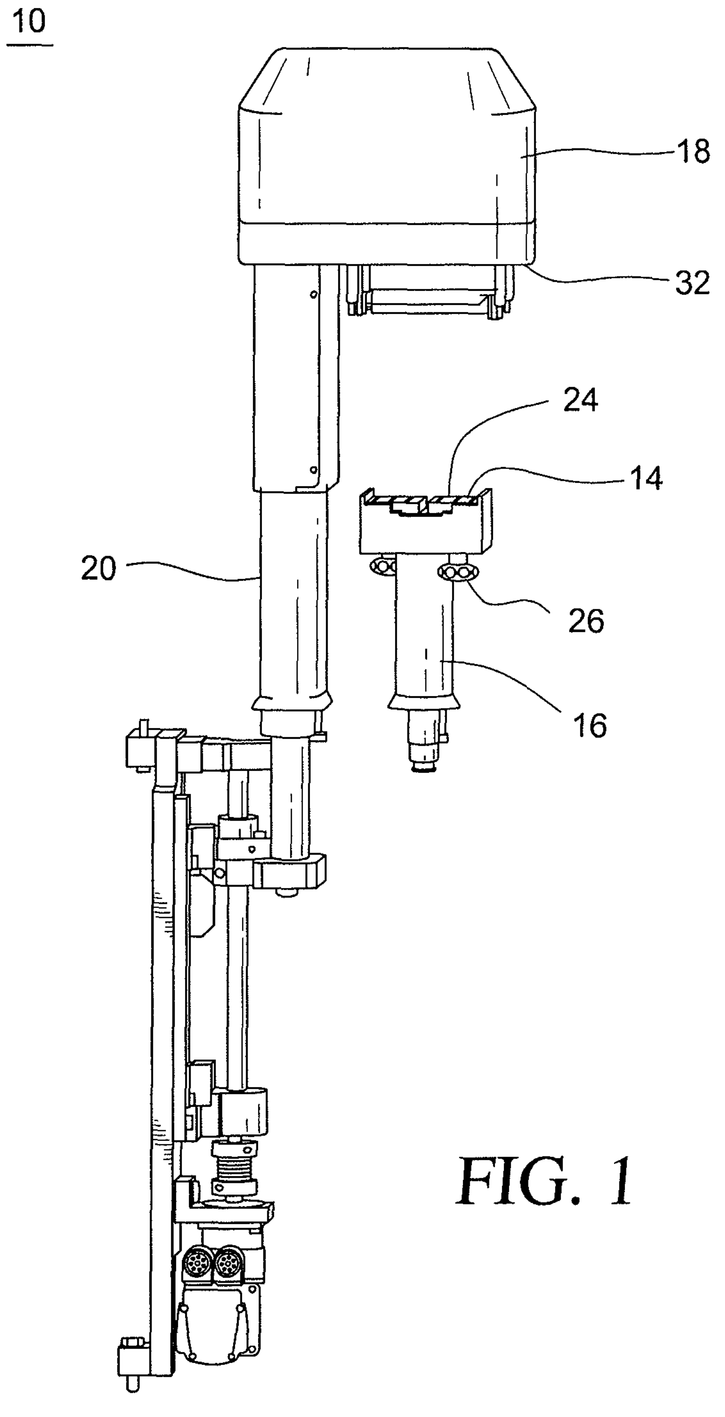
FIG. 1 is a perspective view of a coating assembly in accordance with a preferred embodiment of the present invention.

Turning to the figures, FIG. 1 provides an illustration of a coating assembly 10. The coating assembly 10 comprises a substrate platform 14, a platform support 16, an engagement head 18, and a vertical rail 20 to which the engagement head 18 is mounted. In broad terms, the engagement head 18 is used to engage and lift a substrate 114 (shown in FIG. 12) placed on the substrate platform 14.

The substrate platform 14 and engagement head 18 may be mounted on any structure having a level surface, including, for example, a table (not shown). The substrate platform 14 and engagement head 18 are mounted such that the engagement head 18 is disposed above the substrate platform 14 with a bottom surface 32 of the engagement head 18 being in an opposing facing relationship with a receiving surface 24 of the substrate platform 14. The platform support 16 is disposed intermediate the mounting structure and the substrate platform 14 and positions the substrate platform 14 a fixed height above the mounting structure.

Figure 2:
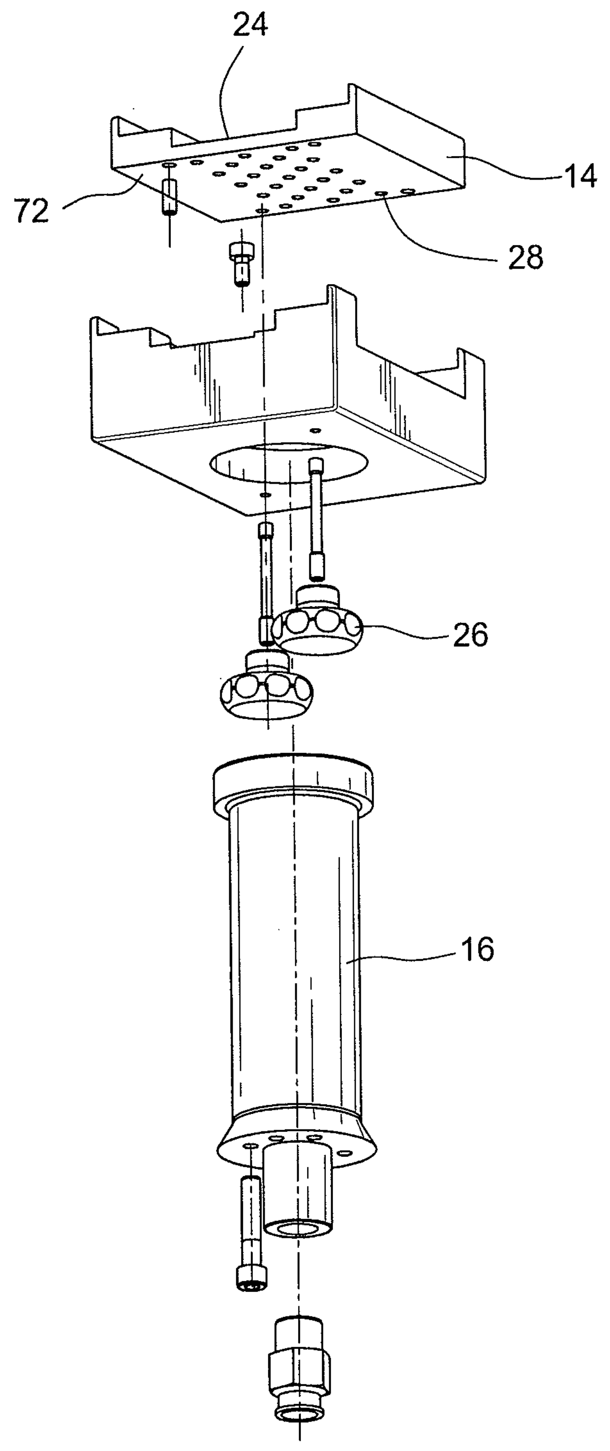
FIG. 2 is an exploded perspective view of a substrate platform and platform support.

FIG. 2 shows the substrate platform 14. The substrate platform 14 is configured so that a coating vessel containing a substrate can be easily fed onto a receiving surface 24 thereof and secured thereto. The shape of the substrate platform 14 is determined based on the dimensions of the coating vessel used to contain the substrate. The substrate platform 14 includes leveling screws 26 disposed on an underside thereof to ensure that the substrate platform 14 is level with respect to the surface on which the assembly 10 is placed and the engagement head 18. It is preferred that the platform 14 be made from a material that is stable, can be cleaned with caustic chemicals, and be autoclaved. Exemplary materials include, but are not limited to, stainless steel and polyetheretherketone (PEEK). Although the platform 14 is being used in a medical application in this description, a material that may be used in non-medical applications may be used.

The coating vessel may be secured to the substrate platform 14 using any standard method, e.g., clamps, air cylinders, or the like. The preferred method for securing the coating vessel to the substrate platform is a vacuum. The substrate platform 14 of FIG. 2 is a vacuum plate having apertures 28 disposed through a floor 72 thereof for pulling a vacuum on a coating vessel disposed thereon.

The coating vessel may have a substantially flat bottom or a bottom that can be pulled flat when the vessel is secured to the platform 14. It is preferred that the coating vessel is sized appropriately for the substrate being placed therein. More particularly, it is preferred that the coating vessel have a volume corresponding with dimensions of the substrate. The coating vessel may be made from a material that is stable and that can be cleaned with caustic chemicals and autoclaved repeatedly. An exemplary preferred material is plastic.

With regard to the substrate 114 (shown in FIG. 12), a variety of porous substrates may be engaged and lifted using the engagement head 18. The substrate 114 will generally be a fabric material having fabric filaments 116 (shown in FIG. 12) protruding from or sticking out from surfaces thereof. The filaments 116 are extraneous to the substrate 114 and enable pins 30 of the engagement head 18 to engage the substrate 114 without piercing or penetrating the substrate 114. In addition, the substrate 114 will generally have a thickness of between 0.04 to 0.09 inches. The size of the substrate 114 may vary; however, a common substrate size is 4 inches×4 inches.

The substrate 114 that is described herein is a flexible fabric matrix that is manufactured from oxidized regenerated cellulose (ORC) fabric backing into which polyglactin 910 (PG910) fibers have been embedded. To form the substrate 114, the PG910 fibers are processed into a non-woven felt sheet and needle-punched into the ORC structure. Both of these materials are identical to those used to manufacture the commercially available products, INTERCEED™ (ORC) and VICRYL™ sutures (PG910). The scope of the invention should not be limited to use of the specific substrate 114 described herein. Rather, any substrate capable of being engaged and lifted by the pins of the engagement head may be used. An exemplary substrate is described fully in commonly-assigned U.S. Patent Application Publication No. US 2006/0257457, which is hereby incorporated by reference in its entirety.

As seen in FIG. 1, the engagement head 18 is operatively connected to the vertical rail 20 in a horizontal orientation and is disposed over the substrate platform 14 such that the bottom surface 32 of the engagement head 18 is in opposing facing relation with the receiving surface 24 of the substrate platform 14. The engagement head 18 includes a plurality of pins 30 (perhaps best seen in FIGS. 6 and 11) that can extend from the bottom surface 32 thereof to engage and lift a substrate 114 that is disposed on the receiving surface 24 of the substrate platform 14.

The engagement head 18 is able to move upwardly and downwardly along the vertical rail 20 thus enabling it to move toward or away from the substrate platform 14 and any substrate 114 that may be present thereon. Movement of the engagement head 18 is controlled by software. The software may be programmed to move the engagement head 18 so that it is disposed in a desired position or at a desired height with respect to the substrate platform 14. Exemplary positions include a home position, a pickup position, and a release position. An exemplary height is a solvation height. These defined positions and heights will be described in greater detail below. Motion controls for other actions of the coating assembly, e.g., vacuum actuation, may also be programmed into the software.

Many conventional movement mechanisms may be used to move the engagement head up and down. Examples include, but are not limited to, a stepper motor, an air cylinder, and the like. A servo driven linear slide is preferred for its complete position and speed control. Such control is valuable during certain phases of the coating process, for example, when lowering a substrate 114 into a coating suspension or solution.

Figure 3:
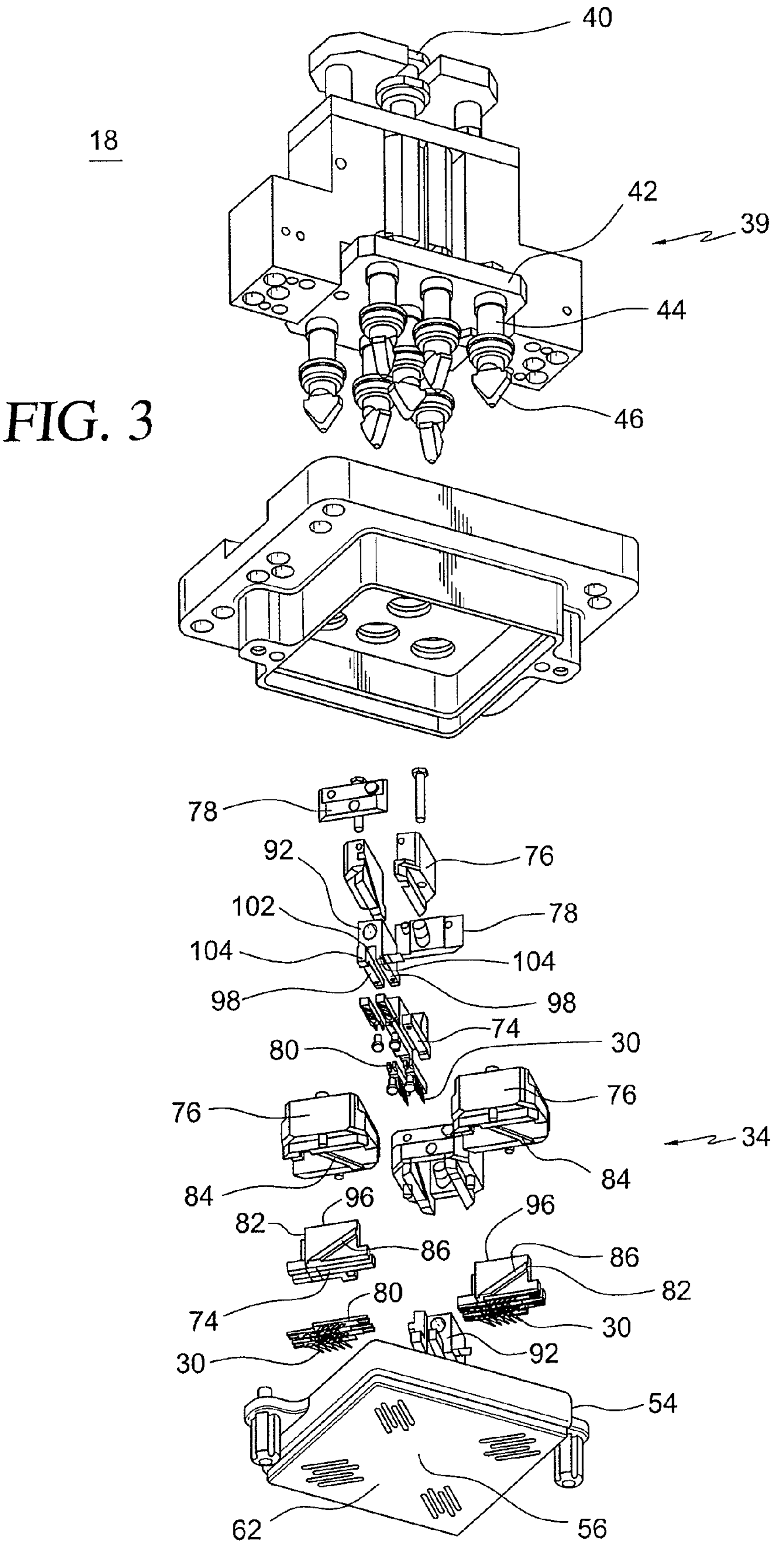
FIG. 3 is an exploded perspective view of an engagement head.
Figure 4:
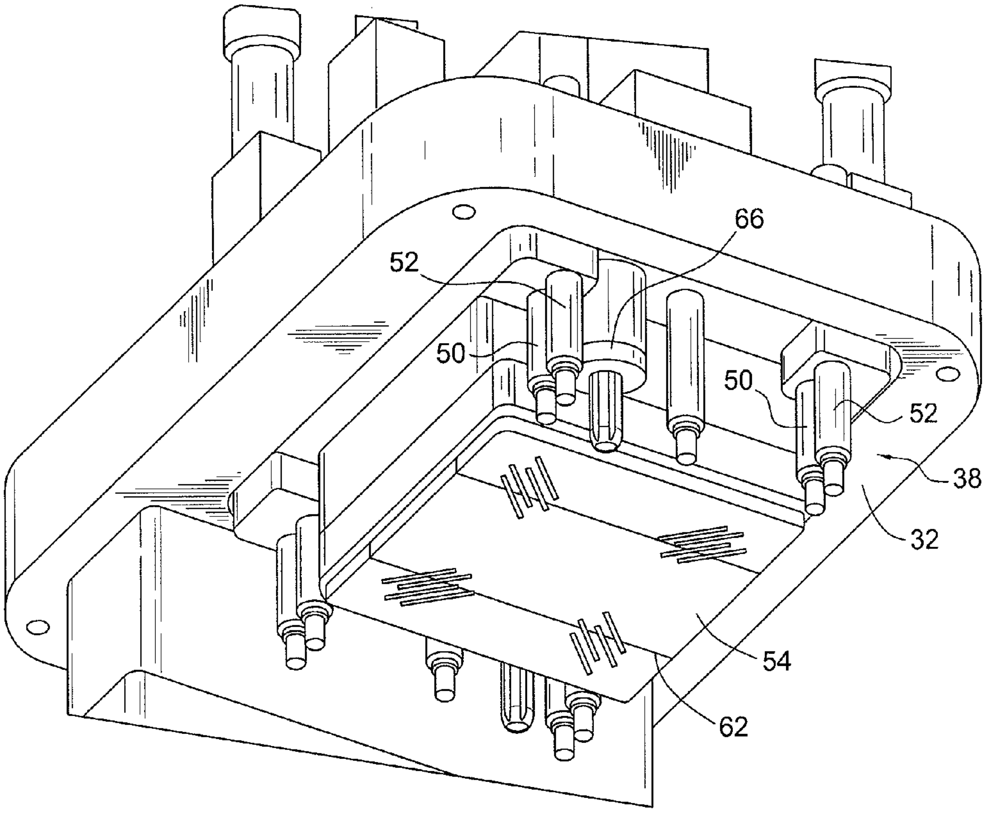
FIG. 4 is a bottom perspective view of the engagement head.
Figure 5:
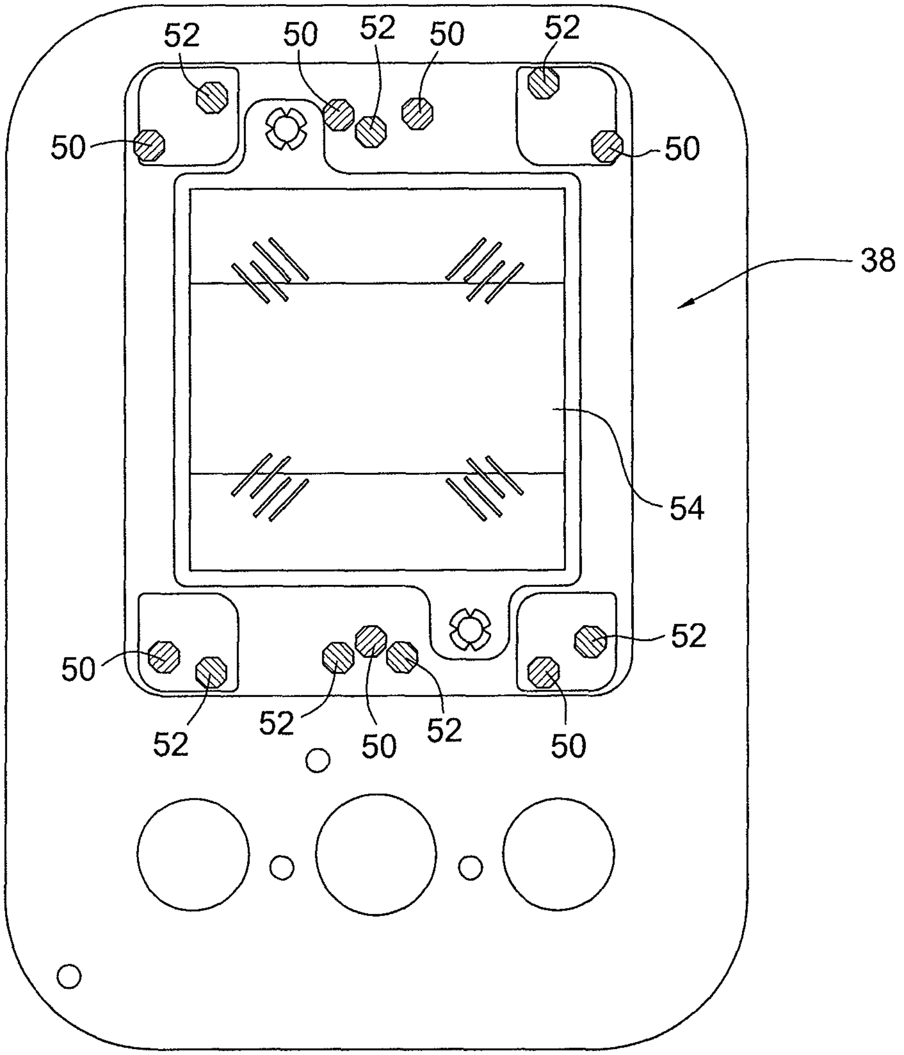
FIG. 5 is a bottom plan view of the engagement head.

FIGS. 3-5 show the engagement head 18. More specifically, FIG. 3 is an exploded view of the engagement head, and FIGS. 4 and 5 are views of a bottom surface of the engagement head showing the sensor array thereof. The engagement head 18 comprises an interchangeable pickup assembly 34, actuating components 39, and a sensor array 38 extending from the bottom surface 32 thereof. The pickup assembly 34 is described as interchangeable because one pickup assembly 34 may be removed and replaced with another pickup assembly 34 having different features. The pickup assembly 34 interchangeability makes the engagement head 18 a more versatile and robust tool.

The actuating components 39 include a single actuation source, which is an air cylinder 40 connected to an air supply line (not shown) in the present embodiment, an actuating plate 42, and a plurality of actuating pins 44. The actuating plate 42 is disposed intermediate the air cylinder 40 and the actuating pins 44 and transfers force exerted by the air cylinder 40 to the actuating pins 44 in a uniform manner. Thus the actuating plate 42 enables the single air cylinder 40 to apply pressure evenly and simultaneously to all of the actuating pins 44 thereby extending and retracting the actuating pins 44 and therefore the engagement pins 30 in unison. Extension and retraction of the engagement pins 30 will be discussed in greater detail below. The actuating pins 44 are identical, including a contoured tip 46, and are mounted to an underside of the actuating plate 42 such that all of the pins 44 extend the same distance from the actuating plate 42. Thus the actuating pins 44 are able to evenly and simultaneously actuate multiple components of the pickup assembly 34. Although the pickup assembly 34 is interchangeable, the actuating components 39 are configured so that they may be used with any pickup assembly 34 that is placed on the engagement head 18. It will be appreciated that a variety of actuating components could be used to exert the required force.

The sensor array 38 depicted in FIG. 4 includes five sensor pairs and the sensor array 38 depicted in FIG. 5 includes seven sensor pairs. It is preferred that the sensor array 38 include seven sensor pairs. Each pair includes a receiver 50 and an emitter 52. The sensor pairs are arranged so that the emitters 52 transmit signals in different directions to prevent the receivers 50 from inadvertently picking up a signal from the wrong emitter 52, i.e., an emitter 52 with which it is not paired. More specifically, four emitters 52 are arranged on one side of the engagement head 18 and three emitters 52 are arranged on an opposite side of the engagement head 18. A receiver 50 for each of the emitters 52 is arranged on the opposite side of the engagement head 18 of its paired emitter

52. The sensors 50, 52 are arranged so that signals sent and received thereby transect an area of the engagement head 18 whereat a substrate 114 (shown in FIG. 12) will be present if a substrate 114 is engaged. The sensor array 38 enables the engagement head 18 to determine many operating variables related to the substrate 114, including, but not limited to, whether a substrate 114 has been engaged, whether a substrate 114 has been lifted, whether a substrate 114 is being uniformly or evenly lifted, and whether a substrate 114 has been released. It will be appreciated that a variety of sensor pair locations and total number may be used although the configuration depicted in FIG. 5 is preferred.

Figure 6:
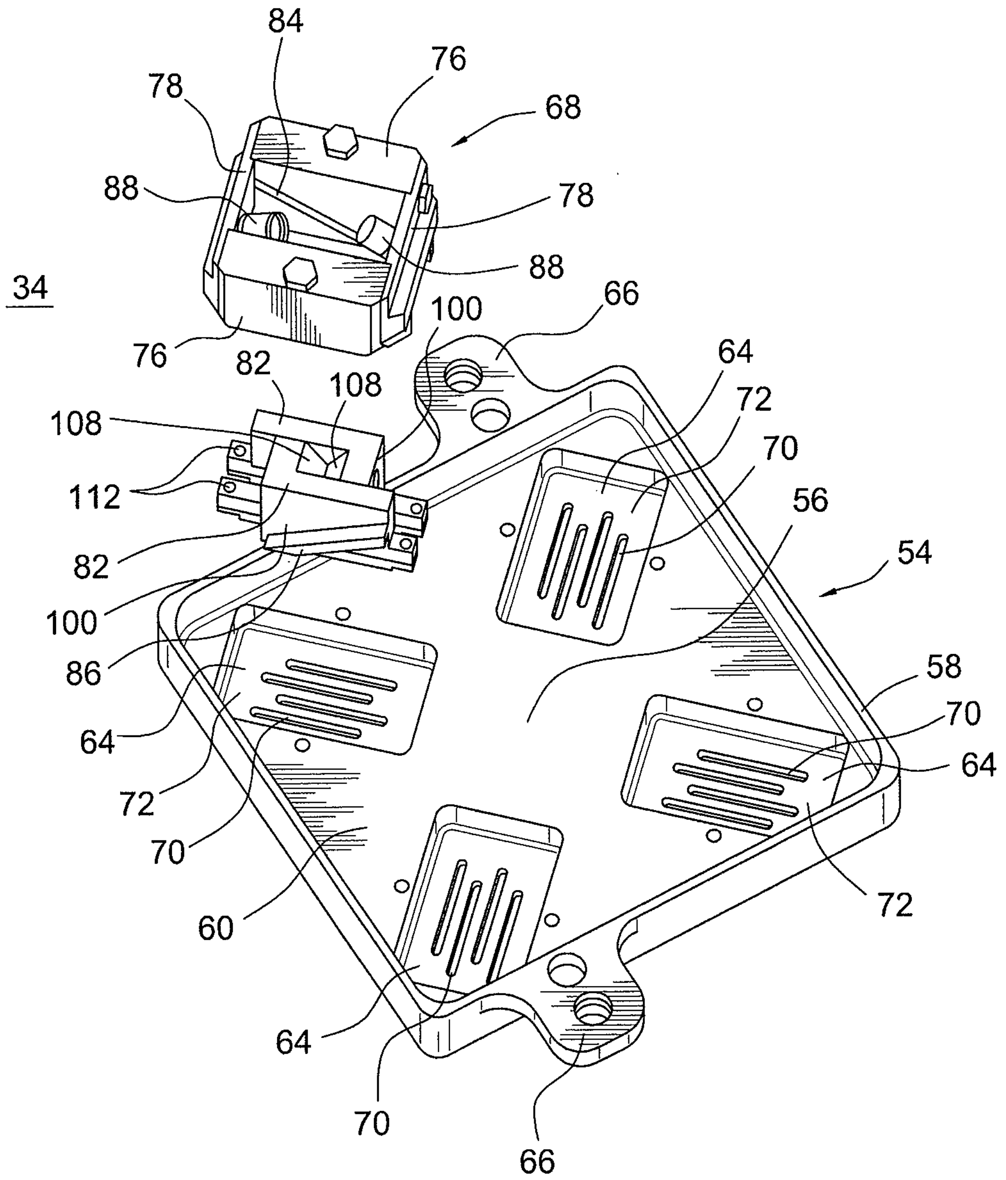
FIG. 6 is an exploded perspective view of a pickup head.
Figure 7:
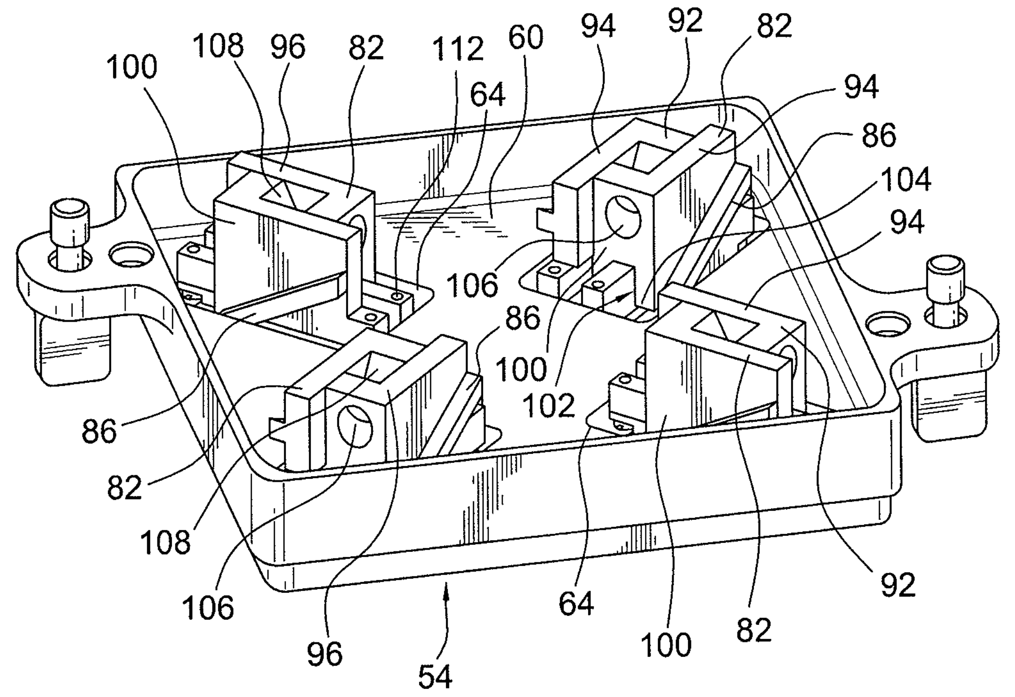
FIG. 7 is a perspective view of the pickup head with pin mounting blocks removed to better illustrate the actuating pedals.

FIG. 6 shows an exploded view of the pickup assembly, and FIG. 7 shows an assembled view of the pickup assembly with the mounting block removed therefrom to illustrate how the actuating pedals are arranged in the recess of the cover plate. The pickup assembly 34 includes a cover plate 54 having a rectangular central portion 56 with a peripheral wall 58 rising from a periphery thereof. The cover plate 54 includes an interior surface 60 and an exterior surface 62 (perhaps best seen in FIG. 3), which are both generally planar except for a plurality of recesses 64 formed in the interior surface 60 of the cover plate 54. The cover plate 54 further includes a pair of mounting tabs 66 projecting generally orthogonally from a rim of the peripheral wall 58. The mounting tabs 66 are disposed on opposite sides of the cover plate 54 and are used to connect the cover plate 54 to the engagement head 18. The mounting tabs 66 may be varied in their location and shape.

While it is preferred to include a plurality of recesses 64 in the interior surface 60 of the cover plate 54, a cover plate 54 having a single recess 64 in the interior surface 60 is within the scope of the invention. It will be appreciated that features may vary for different pickup assemblies 34 including, for example, the number of recesses 64 formed in the cover plate 54. As perhaps best seen in FIG. 9, the cover plate 54 has a thickness that enables the recesses 64 to be formed in the interior surface 60, for example, without protruding into or disturbing the planarity of the exterior surface 62 of the plate 54. The shape, size and depth of the recesses 64 are designed to enable a recess 64 to receive a pin mounting block 68. The particular configuration of the cover plate 54, recesses 64, interior surface 60, and exterior surface 62 may vary.

The number of recesses 64 formed is generally determined by the size of the substrate being engaged and lifted by the engagement head 18. For a 4 inch by 4 inch substrate, it is preferred that there are four recesses 64 in the cover plate 54. For smaller substrates, a pickup assembly 34 having a cover plate 54 with fewer recesses 64 may be used.

Figure 8:
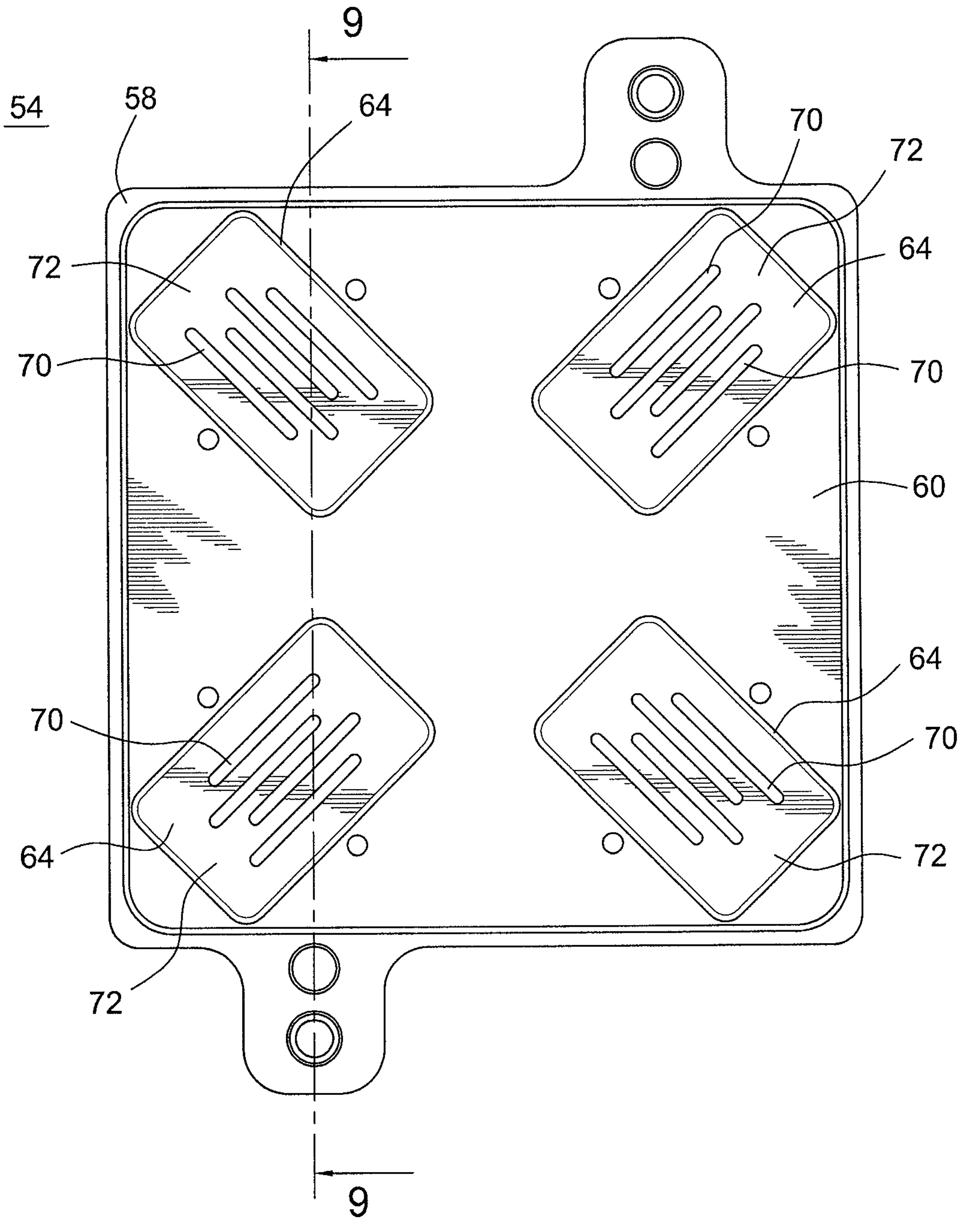
FIG. 8 is a top plan view of a cover plate.
Figure 9:
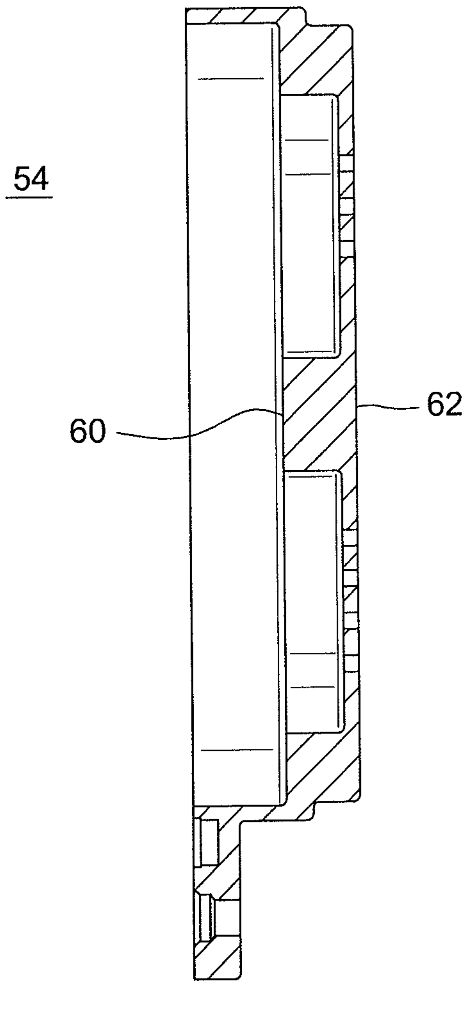
FIG. 9 is a cross-sectional view of the cover plate of FIG. 8 taken along line 9-9.
Figure 10A:
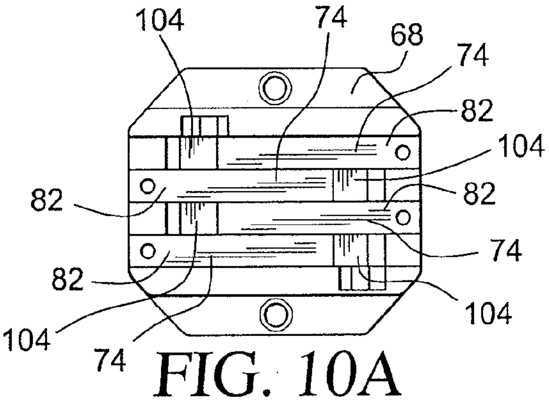
FIG. 10A is a top plan view of a pin mounting block with actuation pedals disposed therein
Figure 10B:
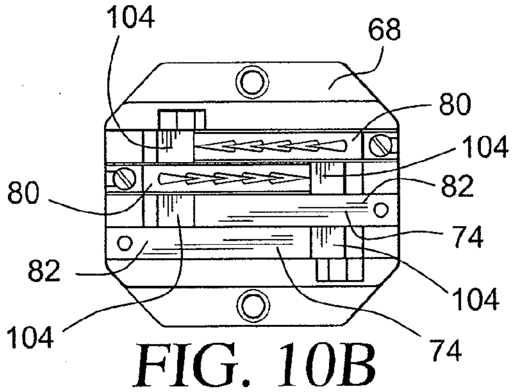
FIG. 10B is a top plan view of the pin mounting block of FIG. 10A with two pin supports disposed therein.
Figure 10C:
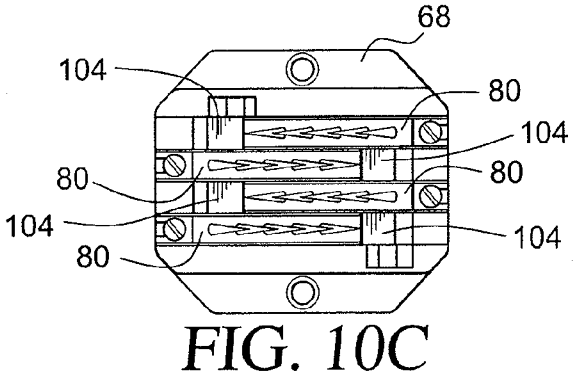
FIG. 10C is a top plan view of the pin mounting block of FIG. 10A with four pin supports disposed therein.
Figure 10D:
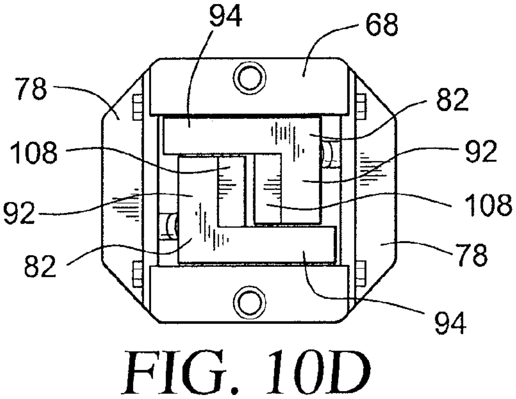
FIG. 10D is a bottom plan view of the pin mounting block of FIG. 10A.

FIGS. 8 and 9 provide top and side cross-sectional views of the cover plate, respectively. A cover plate 54 having four recesses 64 is shown in FIG. 8. To better understand the arrangement of recesses 64 (and components that are disposed in the recesses 64), imagine that a rectangular coordinate system is superimposed over the cover plate 54 with the zero point for the X and Y axes being a center point of the cover plate 54. In this arrangement, the cover plate 54 is divided into four quadrants—upper right, upper left, lower right, and lower left. The recesses 64 are arranged, one in each quadrant, at an angle of 45° with respect to the center point of the cover plate 54.

Each of the recesses 64 includes a plurality of elongated openings or slots 70 formed in a floor 72 of the recess 64. The slots 70 extend completely through the cover plate 54 so that they are also present in the exterior surface 62 of the cover plate 54. In the present embodiment, each recess 64 includes four slots 70 disposed in the floor 72 thereof, which can be seen from the exterior surface 62 of the plate 54 as four slots 70 formed in each quadrant of the exterior surface 62.

The slots 70 are of equal length and are arranged a fixed distance from one another in a parallel orientation. It is preferred that ends of neighboring slots 70 are offset a relatively small distance from one another, so that ends of alternating slots 70 are aligned. The slots 70 are aligned with the 45° angle of the recess 64 within which they are formed. The angular orientation of the recesses 64 and slots 70 advantageously enables the pins 30 of the pickup assembly 34, which are disposed in the slots 70 during a pickup operation, to engage and tension a substrate 114 without deforming or damaging the substrate 114.

The number of slots 70 per recess 64 is variable and is determined based on physical characteristics of the substrate being engaged. For the present substrate 114 (shown in FIG. 12), it is preferred that there are four slots 70 per recess 64. Cover plates 54 having one, two, and four groups of slots formed in the exterior surface 62 thereof are within the scope of the invention. The configuration of slots 70 may also vary.

As indicated above, each recess 64 is configured to receive a pin mounting block 68. FIGS. 10A-10D show a pin mounting block 68 with actuation pedals 82 and pin supports 80 selectively mounted therein. A pin mounting block 68 is generally rectangular having side walls 76 that are longer than end walls 78 thereof (see FIG. 6). The block 68 includes a central receiving area configured to receive a plurality of pin supports 80 (perhaps best seen in FIG. 10C) and a pair of spring-biased, L-shaped actuation pedals 82. The pedals 82 transfer an actuating pressure exerted by an actuating pin 44 (shown in FIG. 3) to pin supports 80 containing pins 30 used to engage a substrate 114.

Each of the side walls 76 of the block 68 has a sloping, linear groove 84 formed therein for receiving a sloping guide ledge 86 of one of the actuation pedals 82. The grooves 84 have an inverse angle orientation with respect to one another to enable the actuation pedals 82 to move downwardly and away from one another when a downward force is exerted thereon by an actuating pin 44. In addition, the end walls 78 of the block 68 have spring receiving recesses 88 formed therein for receipt of compression springs (not shown) used to bias the pedals 82 into their retracted position.

Each actuation pedal 82 includes an end member 92 and a side member 94 (shown in FIG. 7). Further, each member 92, 94 has an end that is fixedly connected to the other member, i.e., an end of the end member 92 is connected to an end of the side member 94 to make the L-shape of the pedal 82, and each member 92, 94 has an end that is open, i.e., not fixedly connected to the other member. When the pedals 82 are arranged in the mounting block 68, the side members 94 of the pedals 82 are aligned with the side walls 76 of the mounting block 68 and the end members 92 of the pedals 82 are aligned with the ends of the mounting block 68. Each pedal 82 has a top face 96 and a bottom face 98 (perhaps best seen in FIG. 3), with the bottom face 98 being oriented toward the floor 72 (shown in FIG. 8) of the recess 64 within which the pedal 82 (shown in FIG. 7) is placed and the top face 96 being oriented away from the floor 72 of the recess 64 within which the pedal 82 is placed. Each side member 94 has a sloping guide ledge 86 (shown in FIG. 6) projecting from an exterior face 100 (shown in FIG. 7) of the side member 94. The sloping guide ledge 86 fits in sliding engagement with the sloping groove 84 (shown in FIG. 6) formed in a corresponding side wall 76 (shown in FIG. 6) of the mounting block 68.

Each end member 92 has a central notched recess 102 (perhaps best seen in FIG. 3) formed in the bottom face 98 thereof. The notched recess 102 forms a profile in the bottom face of the end member defined by two equal length shoulders 104 interposed by a central notched recess 102. A pin support receiving platform 74 (shown in FIGS. 3 and 10A-C) extends orthogonally from each shoulder 104 (shown in FIGS. 3 and 10A-C). The pin support receiving platforms 74 have mounting apertures 112 formed in distal ends thereof for mounting the pin supports 80 thereto.

In addition, each end member 92 (shown in FIG. 7) includes a spring receiving recess 106 formed in an exterior face 100 thereof. The spring receiving recesses 106 of the pedals 82 align with the spring receiving recesses 88 (shown in FIG. 6) of the block 68. A compression spring is disposed in the spring receiving recess pairs 88 (FIG. 6), 106 (FIG. 7). The springs bias the pedals 82 into a retracted position, wherein the end members 92 are disposed a maximum distance from the end walls 78 with which they 92 share a spring. This maximum distance is bound by the open ends of the side members 94 abutting the opposite end walls 78 of the mounting block 68. Each end member 92 also includes a downwardly sloping interior face 108 configured to receive the contoured tip 46 of an actuating pin 44 (shown in FIG. 3).

The pedals 82 are arranged in an inverse, facing relationship with respect to one another in the mounting block 68, so that the sloping interior faces 108 of the end members 92 are in opposite facing relation to one another and so that the open end of the end member 92 of one pedal 82 abuts an intermediate location of the side member 94 of the other pedal 82.

The pedals 82 (shown in FIGS. 7 and 10D) are spring-biased into a retracted position, wherein the sloped interior faces 108 (shown in FIGS. 7 and 10D) of the end members 92 are nearly in abutting relation with another. In addition, in the retracted position, the exterior face 100 (shown in FIG. 7) of each end member 92 is at its greatest distance from the block end wall 78 (shown in FIG. 10D) with which it shares a compression spring.

In the retracted position, the side member interior faces 108 (shown in FIGS. 7 and 10D) create an angled profile that matches the contoured profile of the tip 46 of the actuating pin 44 (shown in FIG. 3) that is used to move the pedals 82 to an extended position. When the tip 46 of the actuating pin 44 presses down on the interior faces 108, the sloping guide ledges 86 (shown in FIGS. 3 and 7) of the pedals 82 move down and out in sliding engagement with the grooves 84 (shown in FIGS. 3 and 6) to move the pedals 82 down and away from one another. Accordingly, the pedals 82 move down toward the floor 72 (shown in FIG. 8) of the recess 64 within which they are disposed and slide away from one another. The pedals 82 (shown in FIG. 7) are guided to slide away from one another by the sliding engagement between the sloped ledges 86 of the pedals 82 and the sloped grooves 84 of the block 68. As the actuating pin 44 (shown in FIG. 3) presses down, the pedals 82 (shown in FIGS. 3 and 7) move away from one another until the exterior faces 100 (shown in FIGS. 6 and 7) of the end members 92 abut the end walls 78 of the block 68. At this point, the pedals 82 are in the extended position. The actuating pins 44 (shown in FIG. 3) hold the pedals 82 in the extended position by overcoming the force of the compression springs and enabling the pedals 82 to remain in the extended position. When the pressure of the actuating pin 44 is removed, the compression springs bias the pedals 82 back to their retracted position.

Figure 11:
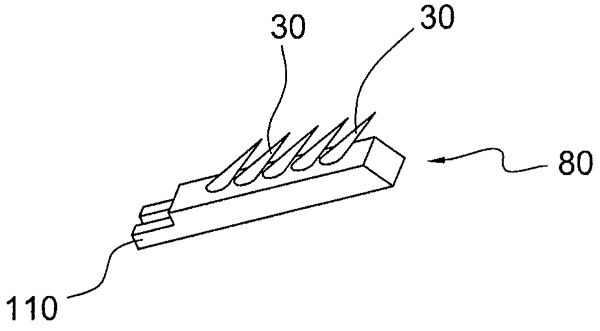
FIG. 11 is a perspective view of a pin support member.

As mentioned above, the actuation pedals 82 (FIGS. 10A-C) include pin support receiving platforms 74 to receive a plurality of pin supports 80. FIG. 11 shows a pin support 80 with pins 30 mounted therein. A pin support 80 has a plurality of needles or pins 30 mounted therein in a row-like configuration, with the pins 30 extending from a single face thereof. The pin support 80 also includes a mounting tab 110 at an end thereof for mounting the support 80 to its corresponding actuation pedal 82.

Pins 30 are mounted in the support 80 at fixed angles ranging from 15° to 45°. All of the pins 30 of a support 80 are mounted at the same angle, in the same direction. The pin angle used for a particular substrate is determined based on the stiffness of the substrate. For the substrate 114 described herein, the preferred pin angle is 28°.

In FIG. 11, the pin support 80 has five pins 30 mounted therein. As with the pin angle, the number of pins 30 mounted in each pin support 80 is variable; however, for the instant substrate, it is preferred to mount five pins 30 per support 80.

Pin supports 80 are disposed adjacent one another in the pin mounting block 68. They are mounted to the pin support receiving platforms 74 such that pin angles for neighboring pin supports 80 are inversely symmetrical, i.e., if the pin angle of the pins 30 of a support 80 is oriented in one direction, the neighboring pin support 80 is placed in the mounting block 68 such that the pin angle of the pins 30 mounted in the second support 80 is oriented in the opposite direction of the pin angle of the first support 80. The plurality of pins 30 mounted in a pin block 68 forms a pin set; therefore, for a particular engagement head, the number of pin mounting blocks 68 will equal the number of pin sets.

In the embodiment described herein, there are four pin supports 80 disposed in each pin mounting block 68. Accordingly, two of the pin supports 80 have pin angles oriented in one direction and two of the pin supports 80 have pin angles oriented in the opposite direction, with the pin supports 80 being disposed in an alternating arrangement in the pin mounting block 68. Further, the pin supports 80 are arranged so that ends of the pin supports 80 having pin angles oriented in the same direction are aligned with one another and are slightly offset from ends of the pin supports 80 having pin angles oriented in the opposite direction. This offset arrangement is a result of the arrangement of pedals 82, to which the supports 80 are mounted, in the mounting block 68.

With regard to actuating the pin supports 80, pin supports 80 having pin angles oriented the same direction are actuated by the same actuating pedal 82. Accordingly, two of the pin supports 80 are actuated by one actuating pedal 82, the pedal 82 to which these pin supports 80 are mounted, and the other two pin supports 80 are actuated by a second actuating pedal 82, the pedal 82 to which these two supports 80 are mounted. Because of the alternating arrangement of the supports 80, the pedals 82 actuate two supports 80 that are separated by an intermediate support 80 rather than actuating two supports 80 that are adjacent to one another. This configuration requires the pedals 82 to accommodate, i.e., not exert force upon, an intermediate support 80 that is not being actuated thereby. Accordingly, the pin supports 80 and pedals 82 are arranged in the mounting block 68 so that the intermediate support of each pedal 82 is disposed in the notched recess 102 of the pedal 82. The pin supports 80 are mounted to the pedal 82 that is actuating them. As the pedals 82 move down and away from one another, so to do the supports 80 mounted thereto.

The pin mounting blocks 68 are mounted in the cover plate recesses 64 with the top faces 96 of the actuation pedals 82 facing away from the floors 72 of the recesses 64 and pins 30 of the pin supports 80 being directed toward the floors 72 of the recesses 64. The pin mounting blocks 68 are arranged in the recesses 64 so that the pin supports 80 are aligned with the plurality of slots 70 disposed in the recesses 64. The slots 70 are configured to receive therethrough the pins 30 of the pin supports 80, with each slot 70 being aligned with a single pin support 80 of a pin mounting block 68. Consequently, the number of pin supports 80 in a pin mounting block 68 is equal to the number of slots 70 in a recess 64. The pins 30 are dimensioned to pass through the slots 70 and extend outwardly away from the exterior surface 62 of the cover plate 54 when the pin supports 80 are actuated to the extended position. The width of the slots 70 is 101% to 110% of the diameter of the pins 30, with the preferred slot width being 105% of the pin diameter.

Figure 12:
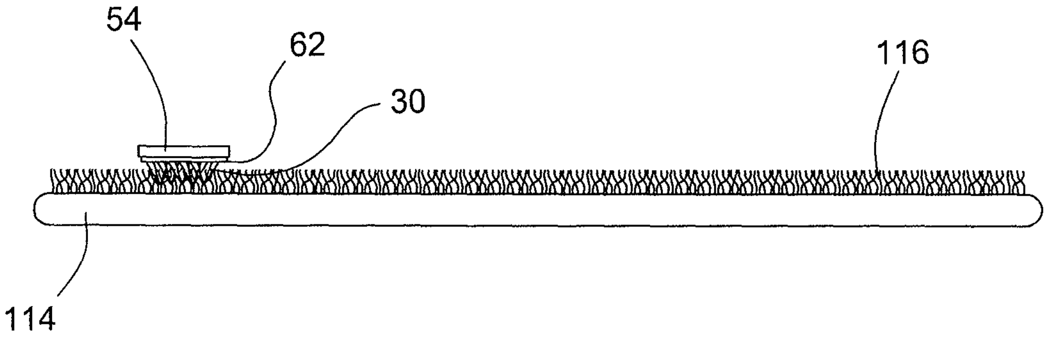
FIG. 12 is a schematic side elevation view of pins engaging fabric filaments of the substrate.
Figure 13:
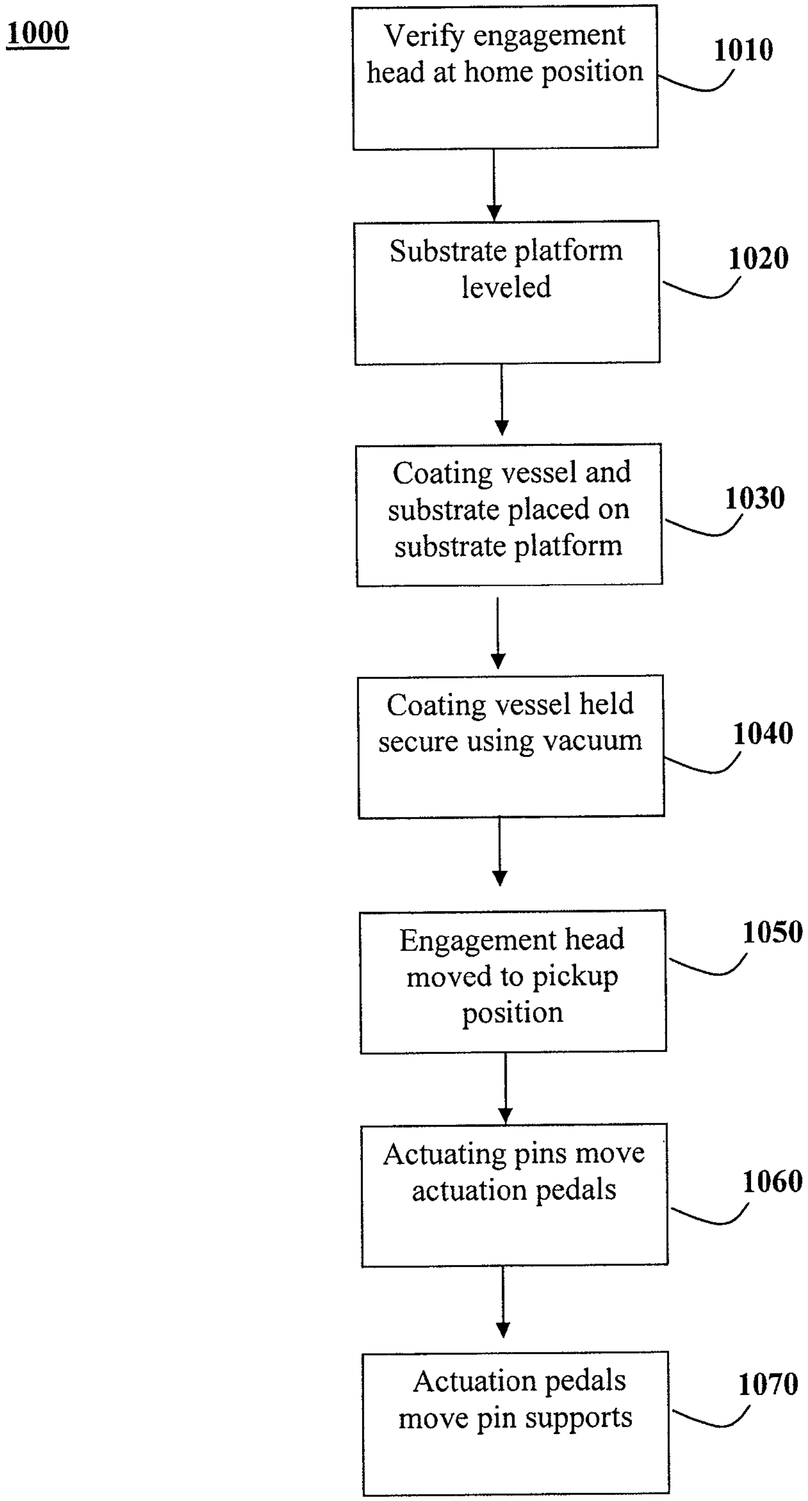
FIGS. 13-17 are flowcharts describing the coating process.
Figure 14:
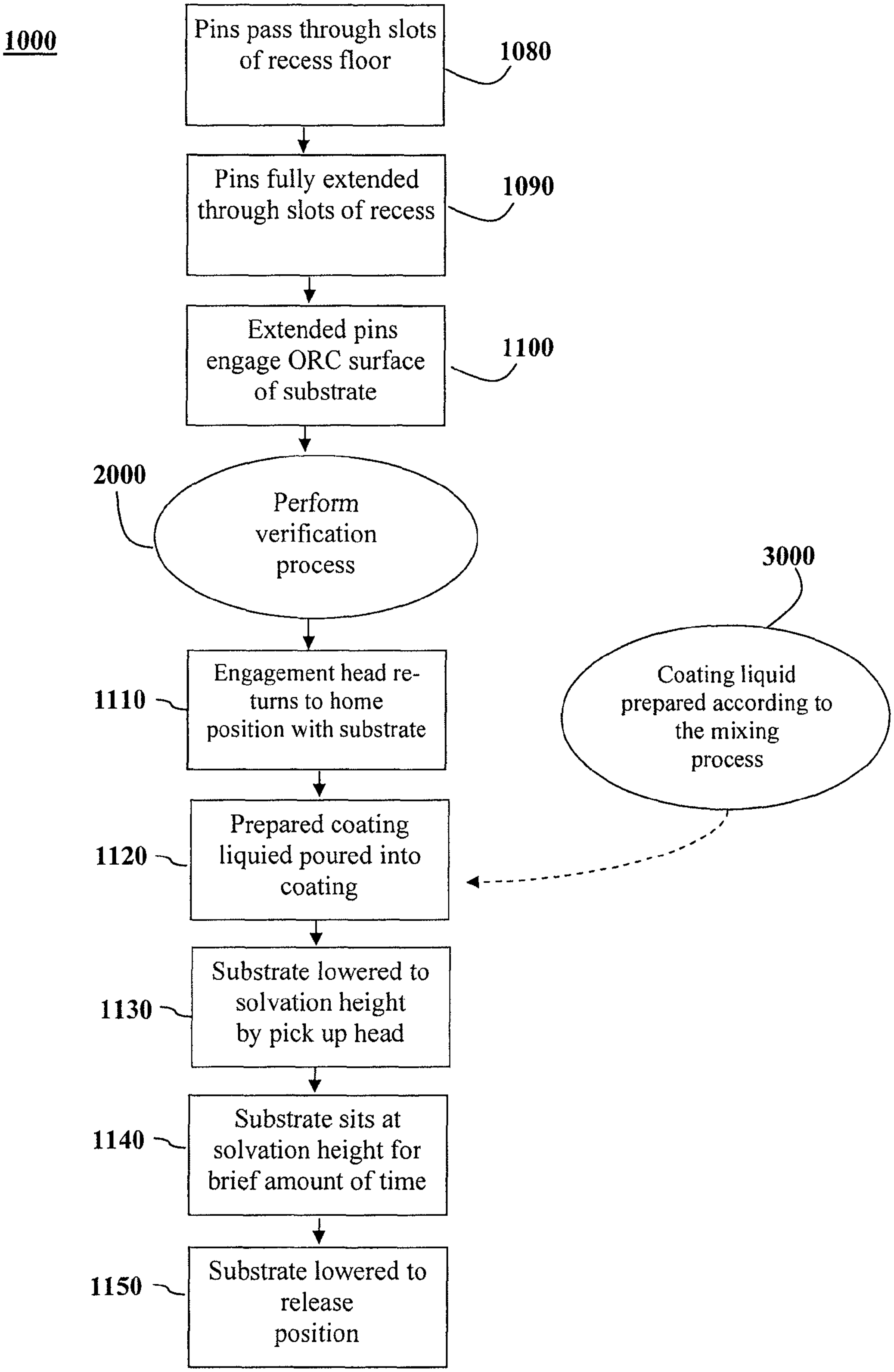
Figure 15:
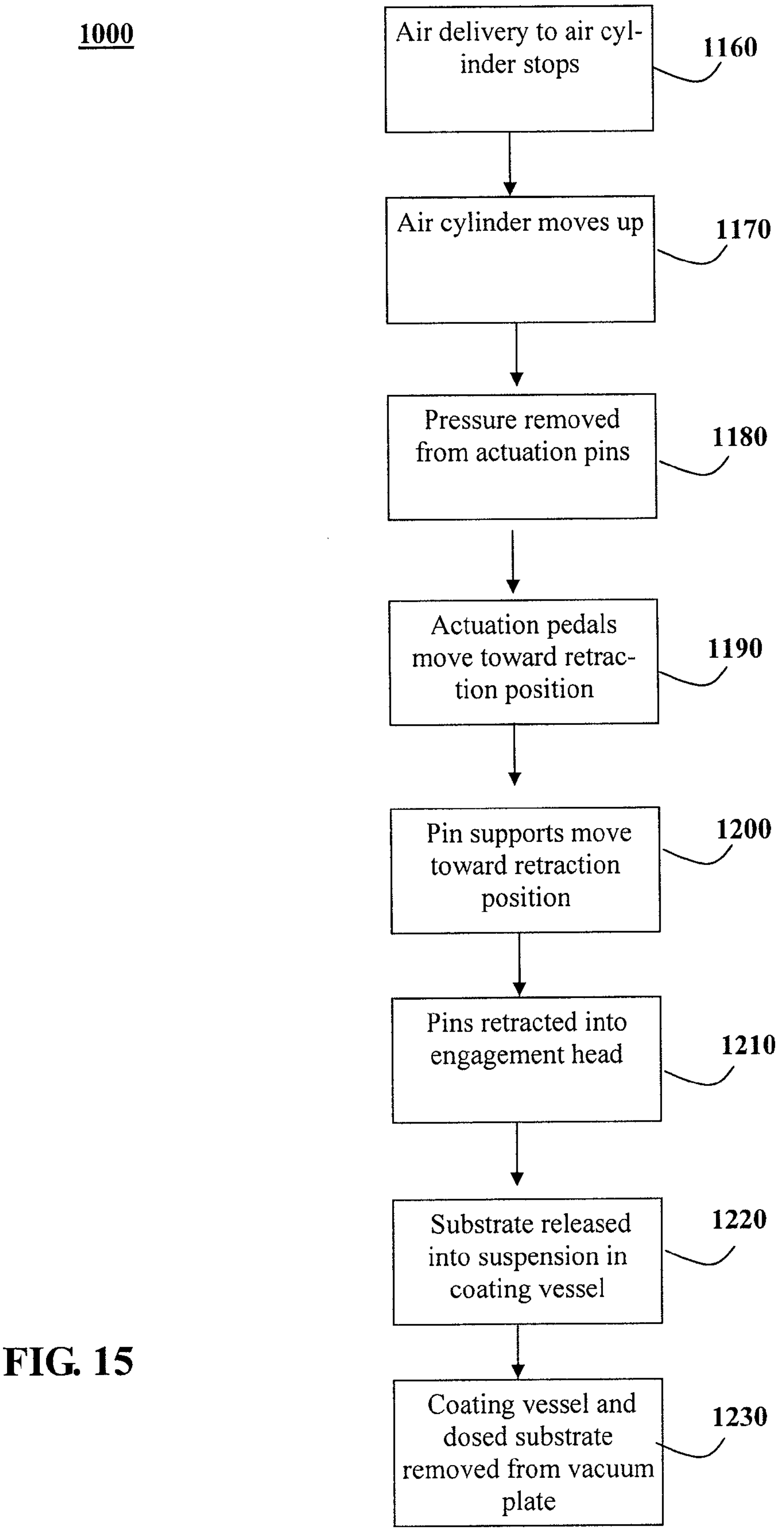
Figure 16:
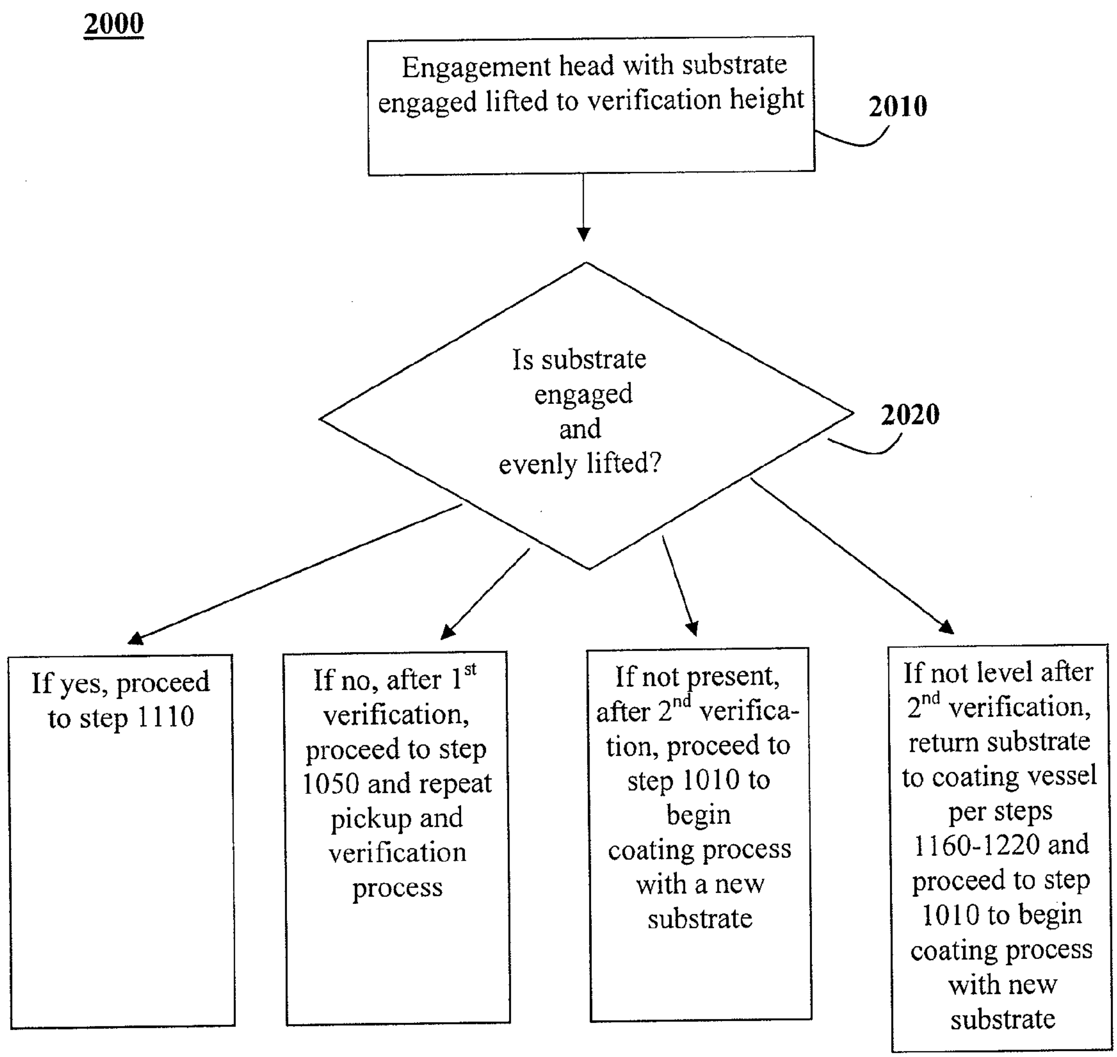
Figure 17:
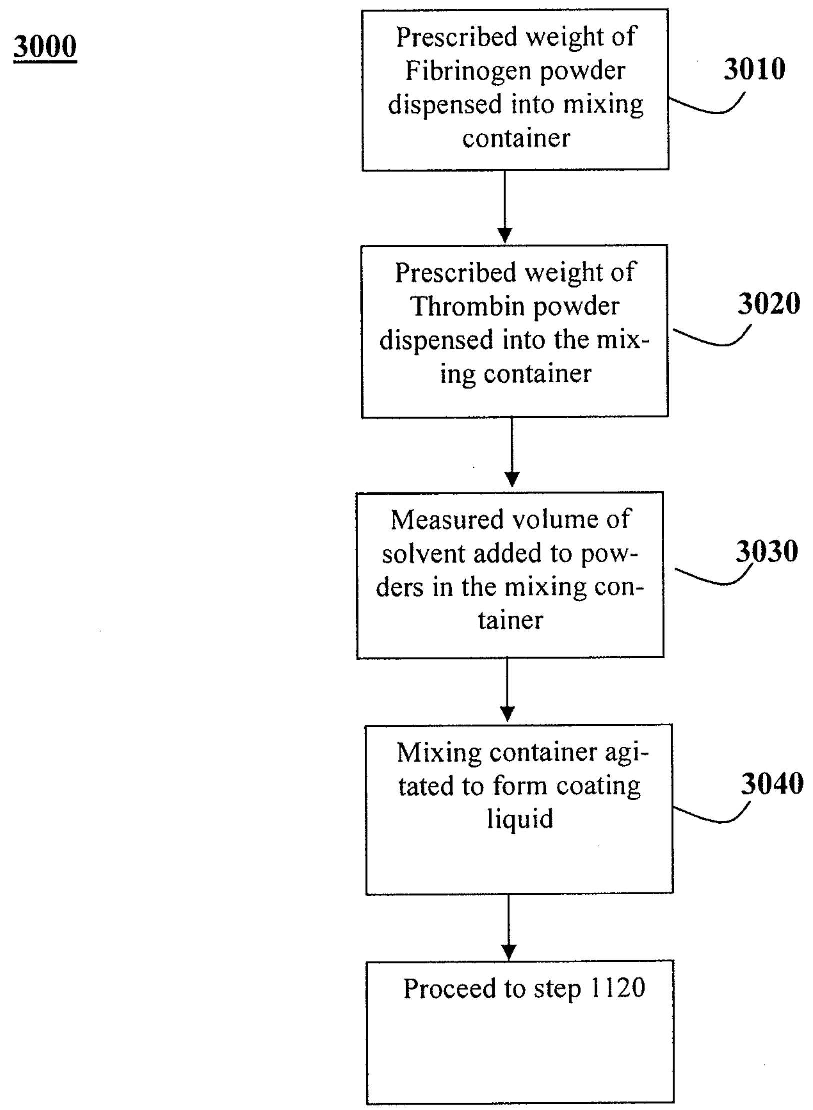

The pins 30 preferably extend from the exterior surface 62 of the cover plate 54 approximately 0.02 inches. The pins 30 and pin configuration (including number of pins and pin angle) are designed to engage fabric filaments 116 of the substrate 114 as shown in FIG. 12. More particularly, it is desired that the pins 30 do not pierce or penetrate the substrate 114 but rather engage the fabric filaments 116 that extend out from the surface of the substrate 114. Engaging the substrate 114 using the substrate filaments 116 enables the substrate 114 to be lifted and released without deforming or damaging the substrate 114.

The pins 30 may be retracted back through the slots 70 via retraction of the pin supports 80 to the retracted position. The pin support 80 is retracted by the actuating pins 44 releasing pressure from the actuation pedals 82 thereby enabling the compression springs to bias the actuating pedals 82 to the retracted position. When the pin support 80 is retracted, no portion of the pins 30 mounted therein is extending from the exterior surface 62 of the cover plate 54. In fact, it is preferred that the pins retract to at least, but not limited to, 1.5 mm below the exterior surface 62 of the cover plate 54. When the pins 30 are retracted from the filaments 116 of the substrate 114 (shown in FIG. 12), the substrate 114 is released from the engagement head 18. Complete retraction of the pins 30 beyond the exterior surface 62 of the cover plate 54 helps in releasing the substrate 114 from the pins 30.

Many design features of the engagement head 18 are chosen to enable the engagement head 18 to engage, lift, and release a porous, and perhaps flimsy, substrate in a manner that enables it to remain relatively flat without its corners or center draping during lifting and releasing. The size and shape of the substrate also factor into the determination of the number of pin mounting blocks 68 (and therefore pin sets) and recesses 64 in a cover plate 54, their position and placement in the cover plate 54, and their orientation. For a four inch by four inch sample of the exemplary substrate 114, it is generally preferred to have four pin mounting blocks 68 and four corresponding recesses 64.

The number of pins 30 per row, the angle at which the pins 30 are oriented, and the number of rows of pins 30 per pin mounting block 68 are chosen to enable level lifting and releasing of the substrate 114. The stiffness of the substrate being lifted affects the ability of the substrate to remain flat when being lifted and released. Therefore, the stiffness of the substrate being lifted is measured to determine these design features of the engagement head 18. The stiffness of the substrate may be measured by picking up the substrate in the center and measuring the angle of the end drop. The larger the end drop angle of the substrate, the more pins 30 required to lift the substrate. For the ORC/PG910 substrate 114, it is generally preferred to have five pins 30 per row and four rows per block 68.

For the ORC/PG910 substrate 114, it has been determined that for a four inch by four inch substrate sample, the preferred number of pins 30 is eighty. Therefore, it is preferred that the pickup assembly 34 has five pins per square inch. If the pickup assembly 34 has more pins per square inch than five, the substrate 114 is not released properly by the pins when the pins are retracted. Further, if the pickup assembly 34 has fewer pins per square inch than five, the substrate 114 is not pickup up evenly. Other substrates will require different numbers of pins per square inch.

In operation, the coating assembly 10 is used to uniformly coat a single side of a porous substrate 114 with a coating liquid according to the coating process 1000 (FIGS. 13-17). To begin the coating process 1000, the presence of the engagement head 18 in the home position is verified (step 1010). In the home position, the engagement head 18 is at an arbitrary height above the substrate platform 14 that creates some working space above the substrate platform 14 that allows for activities to take place on the substrate platform 14. The engagement head 18 returns to the home position between substrates being removed and replaced on the substrate platform 14.

In addition, prior to substrate coating, the planarity of the assembly 10 is verified by leveling the substrate platform 14 (step 1020). The substrate platform leveling screws 26 are used to level the substrate platform 14 with respect to the surface to which it is mounted and with respect to the engagement head 18.

The planarity of the assembly 10 is important to the uniformity of the product fibrin patch. A level assembly 10 enables the substrate 114 and suspension media to be held parallel to each other and maintained in a level position during coating thus allowing uniform application of biological components to the substrate 114. Any portion of the substrate 114 contacting the suspension before the rest could potentially cause the substrate 114 to preferentially wick the suspension in that primary contact area resulting in an uneven deposition of solids. It is desired that the biological components be deposited evenly on the substrate 114 to form a fibrin patch having uniform disposition of biological components.

After the substrate platform 14 is leveled, the coating vessel with the substrate 114 disposed therein is placed on the receiving surface 24 of the substrate platform 14 with the substrate 114 positioned ORC side facing up (step 1030). The coating vessel is held securely against the substrate platform 14 using vacuum (step 1040).

Once the substrate 114 is placed on the substrate platform 14 and the coating vessel has been secured to the substrate platform 14, the engagement head 18 moves to the pickup position. The pickup position is determined by the thickness of the substrate 114 being engaged. The pickup position is designed to allow the pins 30 to extend, for example, approximately about 0.01-0.02 inch into the filaments 116 of the substrate 114. A relatively thick substrate 114 is lifted more evenly if more length of the pins 30 extends into the filaments 116 thereof; therefore, the pickup position for a relatively thick substrate 114 will be closer to the substrate 114 than a pickup position for a relatively thin substrate 114. As indicated previously, the pins 30 extend 0.02 inch from the exterior surface 62 of the engagement head 18; therefore, the pickup position is generally about 0.02-0.03 inch above the substrate 114, depending on the thickness of the substrate 114.

After the engagement head 18 is in the pickup position, air is applied to the air cylinder 40 thus moving the actuating pins 44 downwardly (step 1060). The actuating pins 44 press down upon the actuation pedals 82 thereby sliding the pedals 82 downwardly and away from one another along the grooves 84 of the mounting block 68. The pedals 82 press the pin supports 80 downwardly and away from one another thereby forcing the pins 30 downwardly and slightly outwardly relative to their initial position (step 1070). The pins 30 are aligned with the slots 70 of the recesses 64, and as the pin supports 80 move toward the floors 72 of the recesses 64, the pins 30 begin to pass through the slots 70 (step 1080). Once the pin supports 80 reach the floors 72 of the recesses 64, the pins 30 are completely extended through the slots 70 of the cover plate 54 (step 1090)

The extended pins 30 engage the filaments 116 of the substrate 114 (step 1100). As discussed previously, it is desired that the pins 30 engage the filaments 116 of the substrate 114 without piercing or penetrating the substrate 114 to prevent the substrate 114 from being deformed or damaged. In addition, engaging only the filaments 116 of the substrate 114 enables complete release of the substrate 114 upon pin retraction.

It is further desired that the pins 30 engage the substrate 114 in an even and uniform manner to enable the substrate 114 to be lifted and maintained in a level orientation. The sensor array 38 of the pickup assembly 34 is used to perform a verification process 2000, wherein the sensor array 38 verifies that the substrate 114 is engaged and lifted in a level manner. The sensor array 38 is also used to ensure that the substrate 114 is completely released.

The verification process 2000 begins with lifting an engaged substrate 114 to a verification height. More particularly, after the substrate 114 is engaged (or thought to be engaged), the engagement head 18 is lifted to a verification height (step 2010), and the presence of the substrate 114 and the level orientation of the substrate 114 are verified (step 2020).

If the substrate 114 is present and evenly lifted, the engagement head 18 returns to the home position at step 1110. If the substrate 114 is not engaged or if the substrate 114 is engaged but not lifted evenly, the engagement head 18 returns to the pickup position at step 1050 and proceeds according to the coating process 1000. If the verification process 2000 is being repeated a second time for the same substrate 114, the process 2000 is slightly different if the substrate 114 is not engaged or evenly lifted. If the substrate 114 is not engaged upon second verification, the engagement head 18 returns to the home position at step 1010 to begin the coating process with a new substrate 114. An improperly engaged substrate 114 is removed from the platform 14 and replaced with a new substrate 114. If the substrate 114 is not evenly lifted upon second verification, the engagement head 18 returns the substrate 114 to the coating vessel as outlined in steps 1160-1220 and proceeds to step 1010 to begin the coating process 1000 with a new substrate 114.

After the substrate 114 is engaged evenly, the engagement head 18 lifts the substrate 114 to the home position (step 1110) thereby removing the substrate 114 from the coating vessel. Simultaneously with the substrate 114 being engaged and lifted, a coating liquid is being prepared according to mixing process 3000.

For purposes of this description, the coating liquid is formed using biological components that are lyophilized, milled powders derived from liquid bulk concentrates of human fibrinogen and human thrombin. These concentrates are identical to those used in the manufacture of the second-generation fibrin sealant EVICEL™. Thrombin and fibrinogen are known to be helpful in the blood clotting process. More specifically, thrombin is an enzyme of blood plasma that catalyzes the conversion of fibrinogen to fibrin, the last step of the blood clotting process, and fibrinogen is a protein in blood plasma that is essential for the coagulation of blood and is converted to fibrin by thrombin in the presence of ionized calcium.

The exemplary solvent used to suspend the biological powder components is hydrofluoroether (3M Novec 7000) (HFE). HFE has a relatively high volatility; therefore the biological components remain in suspension in the solvent for a relatively short time. In order for coating to take place when the substrate is introduced to the suspension, the substrate should be immersed in the suspension during the time frame in which biological components are suspended in the solvent.

While an exemplary coating liquid is described herein for coating the substrate, it should be understood that the coating liquid is not limited to the suspension described. The coating liquid may be clear, having color or being colorless. In addition, the coating liquid may be a homogeneous single phase formed from more than one miscible substance and/or may be an emulsions or similar multiphasic system wherein at least one phase is a liquid at operating or use temperature and wherein insoluble or partially soluble particles or materials are suspended in a solvent. Solvents can be aqueous or organic in nature and selected from low boiling alcohols such as methanol, ethanol and isopropanol, ethers, acetone, hydrocarbon solvents such as pentanes, heptanes, hexanes, and octanes, halogenated solvents such as chloroform, methylene chloride, carbon tetrachloride, trichloroethylenes, flourochlorocarbons, ethers and perfluorosolvents such as those previously described and commercially available under the 3M Novec tradename. The aforementioned list does not represent all the possible solvents that could be used. The specific liquid or combination of liquids may be chosen to allow uniform spreading of the liquid phase on the exemplary fabric substrate.

With regard to forming the exemplary coating liquid, a prescribed weight of fibrinogen (BAC2) powder and a prescribed weight of thrombin powder are dispensed into a mixing container (steps 3010 and 3020, respectively). It is preferred that the mixing container is a Nalgene tube with a size to be determined based on the volume of suspension being prepared. A measured volume of HFE is added to the BAC2 and thrombin powders (step 3030) and agitated using a vortex mixer (step 3040). The volume of solvent may be such to result in a suspension weight ratio of solids to liquid ranging from around about 1% to 15% with a preferred range being from around about 5% to 10%.

Returning to the coating process 1000, the coating liquid is then poured into the empty coating vessel (step 1120), and the substrate 114 is immediately and quickly moved to a solvation height by the engagement head 18 where it is held briefly (step 1130). The solvation height is an arbitrary height above the substrate platform 14 that is determined based on a release position. The solvation height is an intermediate position at which the substrate 114 may be held to ensure outside influences are reduced prior to substrate coating. The solvation height can vary from around about 0.1 mm to 50 mm, with a preferred solvation height being from around about 2 mm to 30 mm, and a more preferred solvation height being from around about 7 mm to 10 mm. The substrate is held at the solvation height for a relatively brief period of time, referred to herein as the solvation time. The solvation time allows any residual motion effects, such as vibrations in the substrate caused during movement to the solvation height or wave motion in the coating liquid as a result of pouring, to dissipate. The solvation time can vary from around about 1 second to 120 seconds with a preferred duration being around about 2 seconds to 15 seconds.

With respect to coating a substrate 114 with fibrinogen and thrombin, it is desired to release the substrate 114 into the suspension as quickly as possible; however, it is also desired to remove any outside influences that may arise from moving the substrate 114 quickly from the home position to the release position. Therefore, the substrate 114 is moved very quickly to the solvation height (step 1130) and then allowed to sit for a brief amount of time, the solvation time, to allow any air currents circulating around the substrate 114 to dissipate and to allow the substrate 114 to return to a level orientation (step 1140).

Then, the substrate 114 is moved relatively slowly from the solvation height to the release position (step 1150). The release position is the position at which the bottom surface of the substrate 114 just touches the suspension in the coating vessel. The release position is determined based on the depth of the suspension in the coating vessel. The depth of the suspension in the coating vessel is calculated based on the volume of the coating vessel and the volume of the suspension poured into the coating vessel.

Once the substrate 114 is at the release position, the pins 30 are retracted back into the engagement head 18. Specifically, to retract the pins 30 and return the pin supports 80 to the retracted position, air delivery to the air cylinder 40 stops (step 1160) causing the air cylinder 40 to move upwardly, away from the substrate platform 14 (step 1170) thereby removing pressure exerted on the actuating pins 44 (step 1180). As the pressure is removed from the actuating pins 44, the spring-biased actuation pedals 82 move toward their retracted positions (step 1190) thus moving the pin supports 80 toward their retracted position as well (step 1200). As the supports 80 move to their retracted positions, the pins 30 are retracted through the slots 70 so that no portion of the pins 30 extends from the exterior surface 62 of the engagement head 18 (step 1210). After the pins 30 are retracted, the substrate 114 is released into the suspension that has been poured into the coating vessel (step 1220). At this point, a single side of the substrate 114 is immersed in the suspension. After the substrate 114 is released into the suspension, the coating vessel containing the substrate 114 is removed from the substrate platform 14 (step 1230) so that the coating process 1000 can begin for a new substrate 114.

The controlled immersion process 1000 is advantageous for many reasons. An inherent advantage of an automated process is the potential reduction in product defects as a result of reduced operator handling, thereby improving overall yields.

Elimination of human handling during the coating process is desirable to make the process more efficient and reduce exposure to the powdered biologic components and the suspension solvent. Additionally, process automation and isolation of the coating area reduces the potential risks of contamination.

In addition, the coating process improves product attributes of the product fibrin patch. It is believed that the coating process affects the following attributes of the product fibrin patch: dosage uniformity, pharmaceutical elegance, i.e., visual appearance, and friability, i.e., handling characteristics. Dosage uniformity directly impacts functional performance characteristics of the fibrin patch such as hemostasis and tissue adhesion. Haemostatic potential of the patch is under the control of the fibrinogen and thrombin active components; therefore, it is important for the biologic components to be evenly distributed throughout the substrate. Along with the uniformity of the dose, pharmaceutical elegance of the fibrin patch product is directly affected by the distribution of the biologic solids throughout the substrate support. In particular, uneven surface distribution of the solids along with variable penetration into the substrate construct can negatively impact the physical appearance and potentially biological performance of the product. The substrate is designed to mechanically entrap the particles of biologic powder so they cannot be shaken loose during normal handling and application to the wound site. The potential of the product to shed particles, or its friability, is thought to be influenced not only by the surface distribution of particles but by the penetration of particles as well. The coating process improves the dosage uniformity, pharmaceutical elegance, and friability of the product fibrin patch by placing the substrate into the coating liquid in a manner that enables the coating liquid to coat the surface of the substrate in a uniform, even manner and to penetrate the substrate in an effective manner.

The invention will be illustrated, but in no way limited by, the following examples.

Example 1

It was desired to determine whether a non-woven fabric substrate could be uniformly coated with powders held in suspension by being manually placed in the suspension.

A suspension was formed by combining 1.7 g of a first biological powder and 0.3 g of a second biological powder in 12 mL of methylene chloride to a solid to solvent ratio of 6% and agitating the mixture. The first biological powder was derived from plasma proteins by a cryoprecipitation process and comprised fibrinogen, albumin, immunoglobulin, fibronectin, von Willebrand factor (vWF), Factor VIII, Factor XIII, and excipients. The approximate composition of the first biological powder, as a percent of total solids, was as follows: 40% fibrinogen, 5% fibronectin, 13% albumin and immunoglobulin combined, approximately 1% Factors VIII, XIII and vWF combined, and the remainder excipients. The second biological powder comprised albumin, thrombin, calcium, stabilizers, and excipients. The approximate composition of the second biological powder, as a percent of total solids, was as follows: 15% albumin, approximately 1% thrombin, and the remainder calcium, stabilizers, and excipients. The resulting suspension was poured into a 4.25 inch×4.25 inch receiving tray. A 4 inch×4 inch sample of ORC-PG910 non-woven fabric substrate was manually lowered into the tray containing the suspended biologic powder solids. After the solvent evaporated, the substrate was examined visually and found to have uniform coverage of the biological powders on the side of the substrate that initially contacted the suspension.

Example 2

It was desired to determine the amount of powder retained in a non-woven fabric substrate manually placed in biological powders held in suspension in a methyl perfluoropropyl ether solvent.

A suspension comprising biologic powder compositions similar to those used in Example 1 was formed in a stainless steel container having base dimensions of 2.25 inches×2.25 inches. The first and second biological powder compositions were added to the stainless steal container in the amounts of 0.4 g and 0.06 g, respectively. Methyl perfluoropropyl ether (HFE7000) was combined with the biological powder compositions in the stainless steel container to a relative powder amount of approximately 6 wt %. The stainless steal container was sonicated to create a homogenous dispersion of particles within the HFE7000. A pre-weighed, 2 inch×2 inch non-woven fabric substrate consisting of ORC-PG910 was manually placed into the stainless steel container so that all four edges of the substrate simultaneously contacted the suspension. The substrate was uniformly coated with powder with no uncoated or bare areas. The amount of powder retained by the substrate was determined by weight measurement of the substrate before and after coating and found to be in the range of 92.7-97.4%.

Example 3

It was desired to determine the effect of suspension density on solids retention for a non-woven fabric substrate manually placed in biological powders held in suspension in a methyl perfluoropropyl ether solvent.

Figure 18:
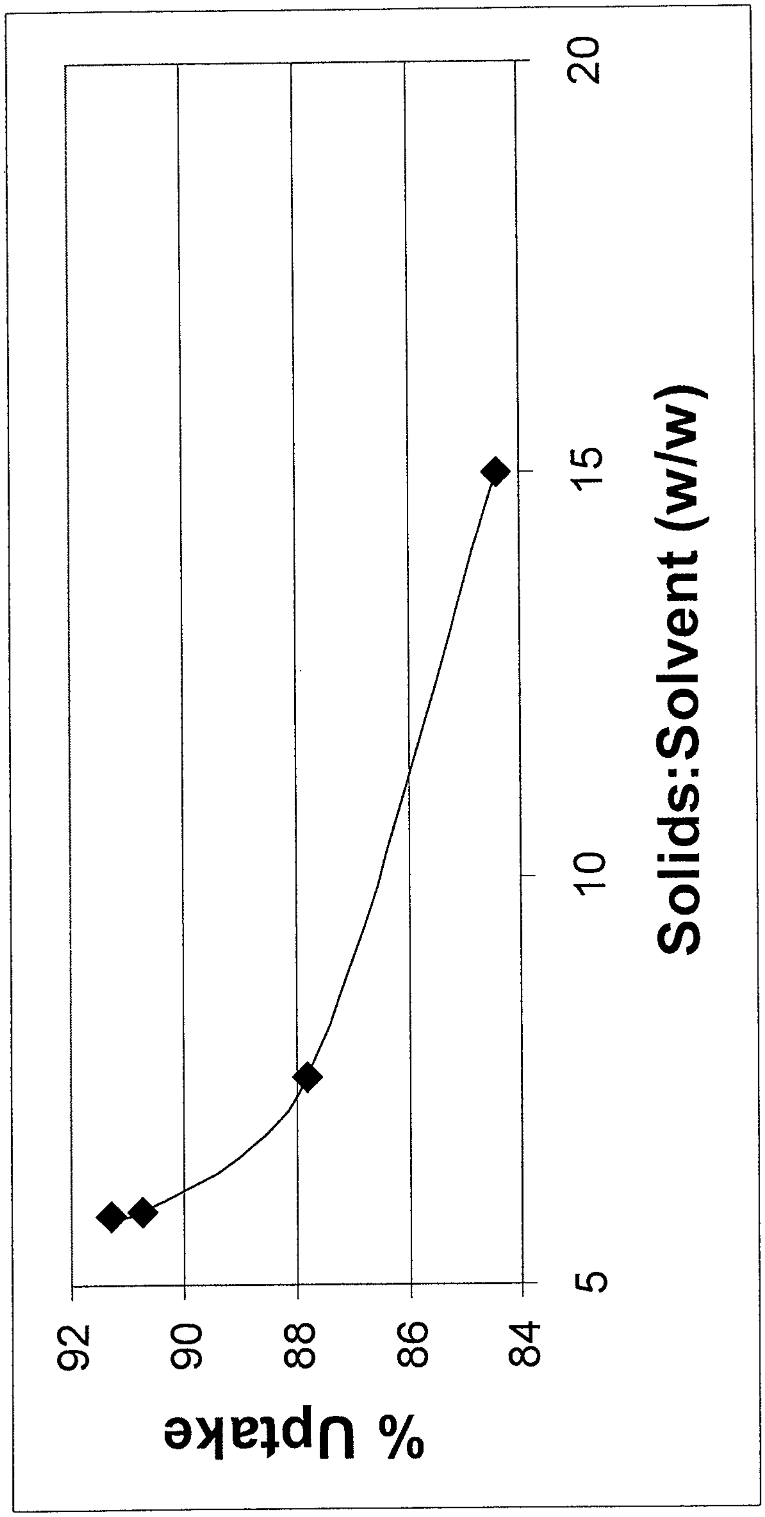
FIG. 18 is a chart showing solids retention as a function of suspension density for Example 3.

Suspensions of fibrinogen and thrombin powders in HFE7000 were prepared by agitating the combined powders in a test tube containing the solvent at solid to solvent ratios of 5.9 wt % (2 samples), 7.6 wt %, and 15.0 wt %, respectively. Pre-weighed substrate samples of 4 inch×4 inch ORC-vicryl non-woven fabric were manually placed in 4.25 inch×4.25 inch trays containing the solid suspensions. Care was taken to maintain substrate planarity when the substrate was placed into the tray to ensure all edges of the substrate contacted the liquid simultaneously. The solvent was allowed to evaporate from the trays, and each coated sample was visually assessed for extent of powder coverage, i.e., uniformity, and weighed. The amount of solids retained was determined from the difference in pre and post sample weights. For one of the substrates coated with a 5.9 wt % solids suspension, the solids retention was 91.3%; for the other of the substrates coated with a 5.9 wt % solids suspension, the solids retention was 90.8%; for the substrate coated with the 7.6 wt % solids suspension, the solids retention was 87.8%; and for the substrate coated with 15 wt % solids suspension, the solids retention was 84.4%. A summary of these results is provided in Table 1 and is graphically shown in FIG. 18. As shown, the amount of solids retained or the percent of solids uptake decreased as the suspension density increased.

TABLE 1

Effect of suspension density on solids retention.

| Suspension density (ratio of solids to solvent, wt %) | Solids Retention (%) | Visual Uniformity |
|---|---|---|
| 5.9 | 91.3 | Acceptable |
| 5.9 | 90.8 | Acceptable |
| 7.6 | 87.8 | Acceptable |
| 15.0 | 84.4 | Poor |

Example 4

It was desired to determine whether solvation time affects the uniformity of solids coverage on a non-woven fabric substrate placed in biological powders held in suspension in a methyl perfluoropropyl ether solvent. It was also desired to determine whether an engagement head could be used to coat a non-woven fabric substrate.

Suspensions of fibrinogen and thrombin powders in HFE7000 were prepared at a solid to solvent ratio of 12 wt %. Three pre-weighed, 4 inch×4 inch ORC-PG910 non-woven fabric substrate samples were coated with the prepared suspension. Each substrate sample was coated using a commercially available, exemplary engagement head. More specifically, a substrate sample was placed in a 4.25 inch×4.25 inch receiving tray and was then engaged and lifted by the exemplary engagement head. The suspension was poured into the tray. The substrate was then brought to a solvation height and maintained there for a solvation time of 2-14 seconds before being lowered to the release position and then being released into the receiving tray. After the solvent evaporated to dryness, a digital image of the sample was captured. The image of each sample was evaluated for uniformity of coverage of the substrate by the biologic powders. This evaluation was accomplished by subdividing each image into sixteen sections and assigning coverage levels of low, medium, and high to each section using a semi-quantitative scale was of 1, 3, and 9, respectively. Summation of these individual scores was then used to generate an overall uniformity score for each sample. For a solvation time of 2 seconds, the visual score was 144; for a solvation time of 8 seconds, the visual score was 126; for a solvation time of 14 seconds, the visual score was 108. The overall uniformity score for each sample is shown in Table 2. As shown, as the solvation time increased, the coating uniformity decreased.

TABLE 2

Effect of Solvation Time on Coating Uniformity.

| Solvation Time (s) | Visual Score |
|---|---|
| 2 | 144 |
| 8 | 126 |
| 14 | 108 |

Example 5

It was desired to demonstrate the impact of various suspension densities on adhesive/sealant properties. It was also desired to determine whether an engagement head could be used to coat a non-woven fabric substrate.

Figure 19:
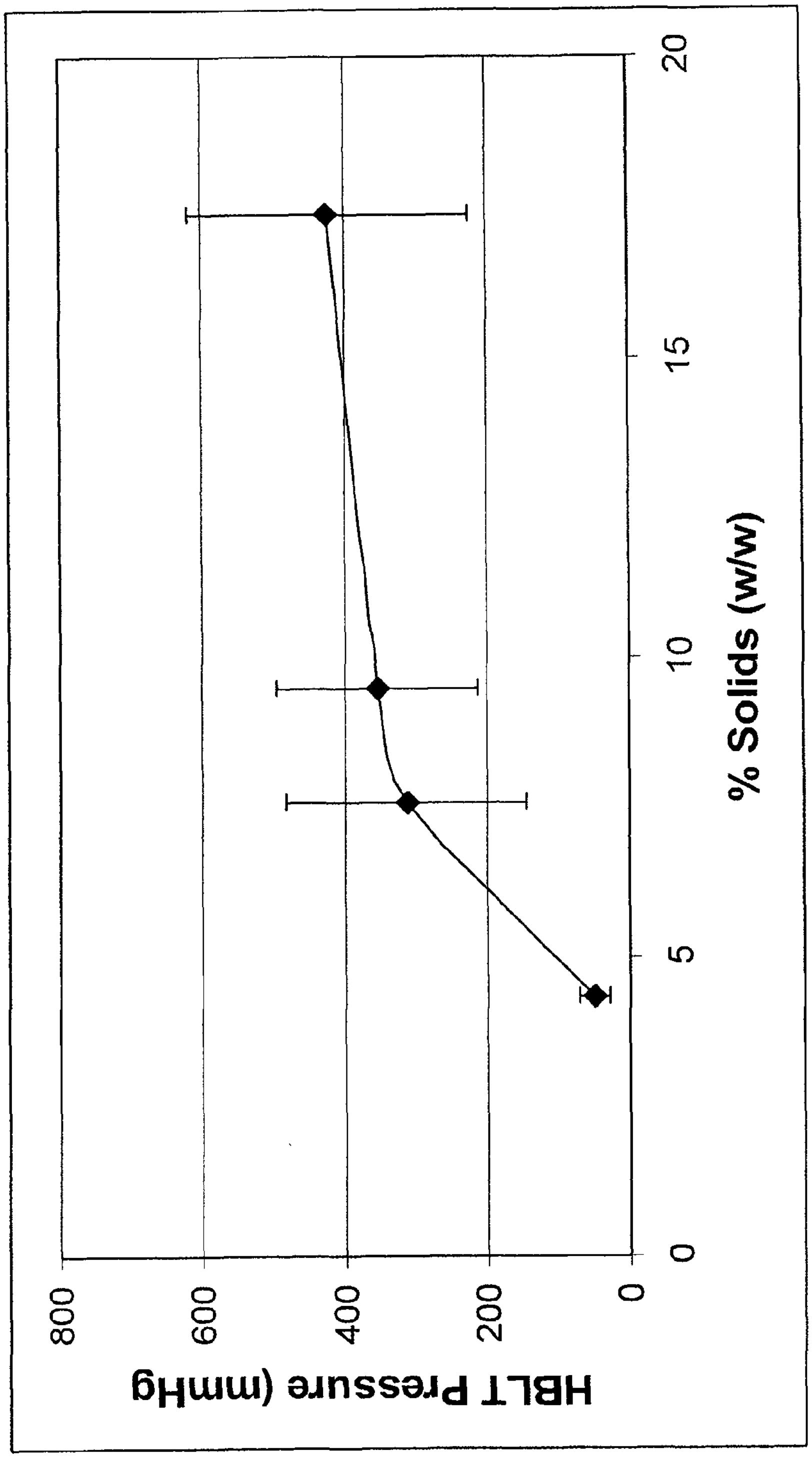
FIG. 19 is a chart showing maximum burst pressure as a function of suspension density for Example 5.

Suspensions of fibrinogen and thrombin powders in HFE7000 were prepared at solid to solvent ratios of 4.3 wt %, 7.6 wt %, 9.5 wt %, and 17.4 wt %. Four pre-weighed, 4 inch×4 inch, non-woven fabric substrate samples were coated with the prepared suspensions. Each substrate sample was coated using a commercially available, exemplary engagement head. More specifically, a substrate sample was placed in a receiving tray and was then engaged and lifted by the exemplary engagement head. A suspension was poured into the tray and the substrate sample lowered and released into the suspension. During the lowering sequence, the substrate sample was brought to a solvation height and maintained there for a solvation time of 2-5 seconds before being lowered to the release position and then being released into the receiving tray. The coated samples were tested using a Hydraulic Burst Leak Test (HBLT). Circular pieces of the coated samples of approximately 0.75 inch in diameter were placed on bovine pericardium into which a hole had been created. The pierced tissue was mounted on an airtight chamber that was subsequently pressurized with saline. The pressure required to disrupt the seal between the tissue and the sample was measured. For the substrate coated with the 4.3 wt % solids suspension, the maximum burst pressure was about 48.5 mmHg; for the substrate coated with the 7.6 wt % solids suspension, the maximum burst pressure was about 313.5 mmHg; for the substrate coated with 9.5 wt % solids suspension, the maximum burst pressure was about 353 mmHg; and for the substrate coated with the 17.4 wt % solids suspension, the maximum burst pressure was about 422.3 mmHg Results of the HBLT tests are provided in Table 3 and are shown graphically in FIG. 19. As can be seen, the maximum burst pressure increased as the suspension density increased.

TABLE 3

| Effect of suspension density on maximum burst pressure. | |
|---|---|
| Suspension density (ratio of solids to solvent, wt %) | Max. Burst Pressure (mmHg) |
| 4.3 | 48.5 ± 22.2 |
| 7.6 | 313.5 ± 169.6 |
| 9.5 | 353.0 ± 140.7 |
| 17.4 | 422.3 ± 195.9 |

Example 6

Porcine Hemostatic Bleeding Model Testing.

It was desired to demonstrate the hemostatic properties of the coated substrate.

One of the coated substrate samples prepared in Example 2 was tested in a porcine vena cava bleeding model. Under general anesthesia, an approximately 1 cm linear incision was made in the vena cava of a pig. A coated substrate sample cut to a size of 1 inch×2 inch was placed on the puncture site. Direct pressure using thumb and fingers was applied to the bleeding site for 1 minute. After 1 minute, pressure was removed and the underlying tissue was inspected for bleeding and oozing. On inspection of the puncture site, the coated substrate sample had achieved hemostasis. The matrix conformed to the tissue surrounding the bleeding site. No breakthrough bleeding occurred during a 5 minute observation period.

Example 7

It was desired to demonstrate the impact of various suspension densities on the efficiency of solids uptake and uniformity when using an embodiment of the engagement head of the invention. It was also desired to determine whether an automated engagement head in accordance with an embodiment of the present invention could be used to coat a non-woven fabric substrate.

Suspensions of fibrinogen and thrombin powders in HFE7000 were prepared at solid to solvent ratios of 6 wt %, 8 wt %, and 12 wt %. Pre-weighed, 4 inch×4 inch, non-woven fabric substrate samples were coated with the prepared suspensions using an embodiment of the engagement head of the present invention. More specifically, the substrate sample was placed in a receiving tray and was then engaged and lifted by the engagement head such that sample planarity was maintained. A suspension was poured into the tray and the substrate sample lowered and released into the suspension. During the lowering sequence, the substrate sample was brought to a solvation height and maintained there for a solvation time of 2-5 seconds before being lowered to the release position and then being released into the receiving tray. The coated samples were assessed for quantity of solids retained and for visual uniformity. A digital image of the sample was captured. The image of each sample was evaluated for uniformity of coverage of the substrate by the biologic powders. This evaluation was accomplished by subdividing each image into sixteen sections and assigning coverage levels to each section using a semi-quantitative scale of 1, 3, 7 and 13 where 1 and 13 were assigned to the lowest and highest amount of coverage for each section, respectively. Summation of these individual scores was then used to generate an overall uniformity score for each sample with a score of 208 representing the highest level of overall uniformity achievable on this scale. For a solids content of 6 wt %, the average visual score was 207 and the uptake efficiency was 94.7%; for a solids content of 8 wt %, the visual score was 201 and the uptake efficiency was 98.5%; for a solids content of 12 wt %, the visual score was 190 and the uptake efficiency was 96.8%. The overall uniformity score for each sample is shown in Table 4. As shown, the coating uniformity marginally decreased as the suspension density increased.

TABLE 4

| Effect of suspension density on solids retention and coating uniformity. | | |
|---|---|---|
| Suspension density (ratio of solids to solvent, wt %) | % Solids Uptake | Visual Score |
| 6 | 94.7 ± 1.6 | 207 |
| 8 | 98.5 ± 1.8 | 201 |
| 12 | 96.8 ± 1.8 | 190 |

Example 8

It was desired to demonstrate the impact of various suspension densities, solvation time, and solvation height on the efficiency of solids uptake and uniformity on a non-woven fabric substrate of small dimensions. It was also desired to determine whether an automated engagement head in accordance with an embodiment of the present invention could be used to coat a non-woven fabric substrate.

Suspensions of biologic powders consisting primarily of albumin were prepared in HFE7000 at a solid to solvent ratio of 6 wt %, 7 wt %, 8 wt %, 9 wt %, and 10 wt %. Pre-weighed, 1 inch×1 inch, non-woven fabric substrate samples were coated with the prepared suspensions using an embodiment of the engagement head of the present invention. The substrate sample was placed in a receiving tray and was then engaged and lifted by the engagement head such that sample planarity was maintained. A suspension was poured into the receiving tray, and the substrate sample was lowered and released into the suspension. During the lowering sequence, the substrate sample was brought to a prescribed solvation height (Table 5) and maintained there for a prescribed solvation time (Table 5) before being lowered to the release position and then being released into the receiving tray. The coated samples were assessed for quantity of solids retained and for visual uniformity. A digital image of each sample was captured. Each image was evaluated for uniformity of coverage of the substrate by the biologic powders using a semi-quantitative scale of 1, 3, 7 and 13 where 1 and 13 were assigned to the lowest and highest amount of coverage for each section, respectively. In general, as the suspension density increased, the solids retention decreased, with the exception of a suspension density of 10 wt %, which had a higher average solids retention than a suspension density of 9 wt %.

TABLE 5

| Effect of suspension density, solvation time, and solvation height on solids retention and coating uniformity. | | | | |
|---|---|---|---|---|
| Suspension density (ratio of solids to solvent, wt %) | Solvation Time (s) | Solvation Height (mm) | % Solids Uptake | Uniformity Score |
| 6 | 2 | 29 | 92.8 ± 1.4 | 13 |
| 6 | 8 | 7 | 92.0 ± 1.6 | 13 |
| 6 | 8 | 51 | 90.9 ± 0.8 | 13 |
| 6 | 14 | 29 | 90.0 ± 2.5 | 13 |
| 7 | 2 | 29 | 91.6 ± 1.0 | 13 |

TABLE 5-continued

Effect of suspension density, solvation time, and solvation height on solids retention and coating uniformity.

| Suspension density (ratio of solids to solvent, wt %) | Solvation Time (s) | Solvation Height (mm) | % Solids Uptake | Uniformity Score |
|---|---|---|---|---|
| 7 | 8 | 7 | 89.1 ± 1.6 | 13 |
| 7 | 8 | 51 | 90.9 ± 1.8 | 13 |
| 7 | 14 | 29 | 90.4 ± 1.0 | 13 |
| 7 | 2 | 7 | 87.5 ± 2.4 | 11.5 |
| 7 | 2 | 51 | 87.2 ± 1.6 | 13 |
| 7 | 8 | 29 | 86.4 ± 1.6 | 13 |
| 7 | 14 | 7 | 81.5 ± 3.3 | 13 |
| 7 | 14 | 51 | 78.6 ± 1.9 | 11.5 |
| 8 | 2 | 7 | 87.0 ± 2.6 | 13 |
| 8 | 2 | 51 | 88.2 ± 5.2 | 13 |
| 8 | 8 | 29 | 85.4 ± 2.3 | 13 |
| 8 | 14 | 7 | 84.9 ± 4.5 | 13 |
| 8 | 14 | 51 | 82.3 ± 2.3 | 11.5 |
| 9 | 2 | 29 | 82.4 ± 3.1 | 11.5 |
| 9 | 8 | 7 | 80.0 ± 3.2 | 9 |
| 9 | 8 | 51 | 83.4 ± 3.6 | 10.5 |
| 9 | 14 | 29 | 77.0 ± 3.6 | 5.5 |
| 10 | 2 | 29 | 83.1 ± 2.5 | 10 |
| 10 | 8 | 7 | 82.0 ± 1.6 | 11.5 |
| 10 | 8 | 51 | 84.7 ± 2.7 | 13 |
| 10 | 14 | 29 | 78.7 ± 2.1 | 10 |

We claim:

1. A pickup assembly for engaging a surface of a substrate without deforming or damaging the substrate, comprising:

(a) a cover plate;

(b) a plurality of pin mounting blocks configured to fit in the cover plate and configured to receive a pair of actuating pedals in an arrangement enabling the actuating pedals to move between a retracted position and an engagement position; and (c) a plurality of pin supports having a plurality of pins extending from surfaces thereof, the plurality of pin supports being mounted to the actuating pedals such that the plurality of pins are directed to the cover plate and such that movement of the plurality of pin supports is controlled by the actuating pedals, and (d) a sensor array to verify that the substrate is engaged and that the substrate is lifted evenly;

wherein the plurality of pins is extended from a surface of the cover plate when the actuating pedals are in the engagement position thereby enabling the plurality of pins to engage the surface of the substrate, wherein the plurality of pins is retracted away from the surface of the cover plate when the actuating pedals are in the retracted position thereby enabling the plurality of pins to release the surface of the substrate, and wherein the pickup assembly can be used in a process for applying a uniform coating of a coating liquid to the surface of the substrate;

wherein the cover plate further comprises a plurality of recesses formed in an interior surface of the cover plate, wherein shape, size and depth of the recesses is enabling the recesses to receive the plurality of pin mounting blocks.

2. The pickup assembly of claim 1, wherein the recess includes a plurality of slots formed in a floor of the recess for extension therethrough of the plurality of pins when the actuating pedals are in the engagement position, wherein said recess and said slots are oriented angularly.

3. The pickup assembly of claim 2, wherein an actuating force moving the actuation pedals between the engagement position and the retracted position is provided by a single actuation source, and wherein the cover plate comprises four recesses.

4. The pickup assembly of claim 1, wherein the pin mounting block and the pair of actuating pedals are configured to move in sliding engagement with one another to move the pair of actuating pedals between the retracted position and the engagement position.

5. The pickup assembly of claim 1, comprising four pin supports.

6. The pickup assembly of claim 1, comprising five pins per pin support.

7. The pickup assembly of claim 1 wherein the plurality of pins extends from the surfaces of the plurality of pin supports at an angle.

* * * * *